US008219969B2

(12) United States Patent
Motoyama et al.

(10) Patent No.: US 8,219,969 B2
(45) Date of Patent: *Jul. 10, 2012

(54) DATA STRUCTURE USED FOR DIRECTORY STRUCTURE NAVIGATION IN A SKELETON CODE CREATION TOOL

(75) Inventors: Tetsuro Motoyama, Cupertino, CA (US); Avery Fong, Castro Valley, CA (US)

(73) Assignee: Ricoh Company, Ltd., Tokyo (JP)

( * ) Notice: Subject to any disclaimer, the term of this patent is extended or adjusted under 35 U.S.C. 154(b) by 1464 days.

This patent is subject to a terminal disclaimer.

(21) Appl. No.: 11/800,844

(22) Filed: May 7, 2007

(65) Prior Publication Data

US 2007/0214450 A1   Sep. 13, 2007

Related U.S. Application Data

(63) Continuation of application No. 10/652,602, filed on Aug. 28, 2003, now Pat. No. 7,308,675.

(51) Int. Cl.
*G06F 9/45* (2006.01)
(52) U.S. Cl. ........................................ 717/106
(58) Field of Classification Search .................. 717/106
See application file for complete search history.

(56) References Cited

U.S. PATENT DOCUMENTS

| | | | |
|---|---|---|---|
| 4,819,233 A | 4/1989 | Delucia et al. |
| 4,875,162 A | 10/1989 | Ferriter et al. |
| 5,197,001 A | 3/1993 | Mukherjee |
| 5,485,601 A | 1/1996 | Ching |
| 5,490,097 A | 2/1996 | Swenson et al. |
| 5,522,078 A | 5/1996 | Matsuzuki |
| 5,537,541 A | 7/1996 | Wibecan |
| 5,548,506 A | 8/1996 | Srinivasan |
| 5,603,020 A | 2/1997 | Hashimoto et al. |
| 5,699,310 A | 12/1997 | Garioff et al. |
| 5,706,502 A | 1/1998 | Foley et al. |
| 5,709,410 A | 1/1998 | Reeves |
| 5,765,140 A | 6/1998 | Knudson et al. |
| 5,826,086 A | 10/1998 | Arima et al. |
| 5,826,252 A | 10/1998 | Wolters, Jr. et al. |
| 5,909,689 A | 6/1999 | Van Ryzin |
| 6,101,481 A | 8/2000 | Miller |
| 6,161,113 A | 12/2000 | Mora et al. |

(Continued)

FOREIGN PATENT DOCUMENTS

WO   WO 98/49640 A1   11/1998

(Continued)

OTHER PUBLICATIONS

"AMS REALTIME Projects Advanced User Guide"; Advanced Management Solutions, Inc.; Dec. 1997; 518 pages.
Dialog "Primavera Extends Lead in High-End Project Management Doftware; Adds Powerful New Features, Functionality to P3" Apr. 1995; Business Wire, p. 04031181.
Duncan "A Guide to the Project Management Body of Knowledge"; Dec. 1996; Project Management Institute Four Campus Boulevard; pp. 1-149.

(Continued)

*Primary Examiner* — John Chavis
(74) *Attorney, Agent, or Firm* — Hickman Palermo Truong Becker Bingham Wong LLP; Edward A. Becker

(57) ABSTRACT

Programming the creation of a software system is facilitated by automating the generation of some of the program code that is necessary for the software system. The generation of program code may be automated based on a software design specification that can be created by developers. The software design specification may be scanned and code may be generated for implementing the software system based on information obtained from scanning the software design specification.

30 Claims, 25 Drawing Sheets

U.S. PATENT DOCUMENTS

| | | | |
|---|---|---|---|
| 6,189,009 | B1 | 2/2001 | Stratigos et al. |
| 6,222,530 | B1 | 4/2001 | Sequeira |
| 6,236,409 | B1 | 5/2001 | Hartman |
| 6,308,164 | B1 | 10/2001 | Nummelin et al. |
| 6,351,734 | B1 | 2/2002 | Lautzenheiser et al. |
| 6,385,765 | B1 | 5/2002 | Cleaveland et al. |
| 6,405,361 | B1 | 6/2002 | Broy et al. |
| 6,405,364 | B1 | 6/2002 | Bowman-Amuah |
| 6,415,387 | B1 | 7/2002 | Aguilar et al. |
| 6,487,469 | B1 | 11/2002 | Formenti |
| 6,496,833 | B1 | 12/2002 | Goldberg et al. |
| 6,578,005 | B1 | 6/2003 | Lesaint et al. |
| 6,581,040 | B1 | 6/2003 | Wright et al. |
| 6,609,200 | B2 | 8/2003 | Anderson et al. |
| 6,678,698 | B2 | 1/2004 | Fredell et al. |
| 6,698,010 | B1 | 2/2004 | Yamanouchi et al. |
| 6,842,760 | B1 | 1/2005 | Dorgan et al. |
| 6,859,768 | B1 | 2/2005 | Wakelam et al. |
| 6,895,382 | B1 | 5/2005 | Srinivasan et al. |
| 6,901,579 | B1 | 5/2005 | Suguta |
| 6,957,189 | B2 | 10/2005 | Poage et al. |
| 6,968,343 | B2 | 11/2005 | Charisius et al. |
| 7,107,268 | B1 | 9/2006 | Zawadzki et al. |
| 7,137,100 | B2 | 11/2006 | Iborra et al. |
| 7,237,224 | B1 * | 6/2007 | Motoyama et al. ........... 717/106 |
| 7,299,408 | B1 | 11/2007 | Daconta et al. |
| 7,509,687 | B2 | 3/2009 | Ofek et al. |
| 2001/0037490 | A1 | 11/2001 | Chiang |
| 2002/0046394 | A1 | 4/2002 | Do et al. |
| 2002/0077879 | A1 | 6/2002 | Uchida et al. |
| 2002/0199168 | A1 | 12/2002 | Namito |
| 2002/0199170 | A1 | 12/2002 | Jameson |
| 2003/0200531 | A1 | 10/2003 | Fairweather |
| 2004/0006765 | A1 | 1/2004 | Goldman |
| 2004/0153992 | A1 | 8/2004 | Molina-Moreno et al. |
| 2004/0162750 | A1 | 8/2004 | Motoyama |
| 2005/0044295 | A1 | 2/2005 | Wakeam et al. |
| 2005/0060317 | A1 | 3/2005 | Lott et al. |
| 2005/0080714 | A1 | 4/2005 | McHale et al. |
| 2006/0053043 | A1 | 3/2006 | Clarke |
| 2007/0073695 | A1 | 3/2007 | Conlan et al. |

FOREIGN PATENT DOCUMENTS

| | | |
|---|---|---|
| WO | WO9849640 | 11/1998 |
| WO | WO9904370 | 1/1999 |

OTHER PUBLICATIONS

Christenberry et al., "Project and Employee Time Tracking for Information Systems and Technology", Nov. 1996, Georgia State Univ., pp. 0-14.

Paynter "Software engineering project management, estimation and metrics: Discussion summary and recommendations" Dec. 1996; University of Auckland, New Zealand; pp. 500-503.

Jurison "Software Project Management: The Manager's view"; Sep. 1999; Communications of the Association for Information Systems; pp. 1-57.

Katz et al "Performance and the Locus of Influence in the R&D Matrix"; Mar. 1985; The Academy of Management Journal, vol. 28; pp. 67-87.

Mitchell, K. "Managers get a needed boost with project linking", Dec. 1997, PC Week, V4, n50, Diaog file 47, Accession No. 03021023.

Goldmann, S., "Procura: a project management model of concurrent planning and design", digital library, 2 pages.

Foster, I., "Automatic Generation of Self-Scheduling Programs", IEEE Transactions on Parallel and Distributed Systems, vol. 2, No. 1, Jan. 1991, pp. 68-78.

Joyce, W., "Matrix Organization: A Social Experiment", Academy of Management Journal 1986, vol. 29, No. 3, p. 1 of 1.

Manna, Z., "The Automatic Synthesis of Recursive Programs", Artificial Intelligence Lab, Stanford University, ACM 1977, pp. 29-36.

Nishida, et al., "Semi-Automatic Program Construction From Specifications Using Library Modules", IEEE Transactions on Software Engineering, vol. 17, No. 9, Sep. 1991, pp. 853-871.

Petrie, et al., "Agent-Based Project Management", 25 pages, http://www.cdr.stanford.edu/ProcessLink/papers/DPM/dmp.html.

Landy, et al., ProQuest: Borland JBuilder Developer's Guide, 10 pages, http://proquest.safaribooksonline.com/067232427X.

Tampere University of Technology, "Developing WWW-Based Project Management Tools for a Large Scale Project", 77 pages.

Claims, Foreign application number, 07109677.0-1238, 3 pages.

European Patent Office, "European Search Report", Foreign application number, 07109677.0-1238, received Oct. 29, 2007, 8 pages.

Angermeier, George, "Cooperative Project Management with RPLAN:", XP-002345614, Copyright Projekt Magazin, Oct. 2002 edition, 6 pages.

Maurer, Frank et al., "Merging Project Planning and Web-Enabled Dynamic Workflow Technologies", XP-002345613, IEEE Internet Computing, Jun. 2000, 10 pages.

Buchbinder et al., "Oracle Project Management, Release 11i", XP-002345049, Oracle, User guide, part No. B10895-02, May 2004, 354 pages.

Janne, "Developing WWW-Based Project Management Tools for a Large Scale Project", dated Dec. 1997, Tampa University of Technology Department of Information Technology, 80 pages.

Christenberry, J. Reid, et al., "Project and Employee Time Tracking—For Information Systems and Technology", dated Nov. 14, 1996, Georgia University, 17 pages.

Mitchell, Karen, "Managers get a needed boost with project linking", dated Dec. 15, 1987, PC Week, v4, n50, Copyright The Gale Group, Dialog Accession No. 03021023, 4 pages.

Steinbrecher "Project management software allows managers to plan, schedule, and control any project", Feb. 1987, Today's Office v21n9, Dialog file 15, Accession 00351477, pp. 8-14.

Giridhar "The computerized project planning system", Dec. 1998, Transactions of AACE International, Dialog file 275, Accession No. 01103603, pp. PS13-PS16.

Edwards "Project Management With the PC", Oct. 1984, PC Magazine, v3, n21, pp. 109-117, Dialog file 275, Accession No. 01103603.

Goldmann, S., "Procura: a project management model of concurrent planning and design", 5th International Workshops on Enabling Technologies: Infrastructure for Collaborative Enterprises, 1996, printed May 13, 2007, 2 pages.

Janne, "Developing WWW-Based Project Management Tools for a Large Scale Project", Tampere University of Technology, Department of Information Technology, Master of Science Thesis, Jan. 1998, 80 pages.

Petrie, Charles et al., "Agent-Based Project Management", Center for Design Research, Stanford University, Sep. 1999, 25 pages.

U.S. Appl. No. 10/652,603, filed Aug. 28, 2003, Office Action, Mailing Date Apr. 27, 2009.

U.S. Appl. No. 11/494,912, filed Jul. 28, 2006, Notice of Allowance, Mailing Date Sep. 16, 2010.

U.S. Appl. No. 11/803,915, filed May 15, 2007, Office Action, Mailing Date Feb. 28, 2011.

Landy et al. "Borland® JBuilder™ Developer's Guide", Dec. 18, 2002, SAMS Publishing, excerpts, 10 pages.

U.S. Appl. No. 10/785,329, filed Feb. 23, 2004, Final Office Action, Mailing Date Nov. 25, 2008.

U.S. Appl. No. 10/785,858, filed Feb. 23, 2004, Final Office Action, Mailing Date Nov. 24, 2008.

U.S. Appl. No. 10/785,858, filed Feb. 23, 2004, Final Office Action, Mailing Date Feb. 2, 2010.

Leslie, "Cost Forecasting—Beyond the Crystal Ball", Transactions of AACE International, Dialog file 15, Accession No. 01615178, Dec. 1996, 13 pages.

U.S. Appl. No. 10/652,603, filed Aug. 28, 2003, Office Action, Mailing Date Jun. 13, 2008.

U.S. Appl. No. 11/724,757, filed Mar. 15, 2007, Mailing Date Jun. 29, 2011.

* cited by examiner

Organization of Software Design Specification Directory

Output Directory

Format of Class Specification

| %m_ClassRelativeIncludePath 1510 ||
|---|---|
| Class or Structure Name | Relative Path |
| 1512 | 1514 |

FIG. 15A

| %m2_ClassStructFunctionDecl 1520 | | |
|---|---|---|
| Class or Structure Name | Function Table | |
| 1522 | Function Name | Function Declaration |
| | 1527 | 1529 |

| %m1_AbsTargetPathForClassStrctTable 1530 ||
|---|---|
| Class or Structure Name | Absolute Path |
| 1532 | 1534 |

FIG. 15C

| %m1_FileClassStrctTable 1540 ||
|---|---|
| Filename | Class or Structure Name |
| 1542 | 1544 |

FIG. 15D

%m_ClassIncludeRelativePath

| Class or Structure Name | Relative Path |
|---|---|
| CTimer | Timer\ |
| CTimerSystemRegistry | Timer\ |
| CMonitorService | MonitorService\ |
| SKeyValueInfo | Monitor |
| CMonitorManager | Monitor\MonitorManager\ |
| CDeviceFactory | Monitor\Device\ |
| CDevice | Monitor\Device\ |
| CDeviceODBC | Monitor\DeviceODBC\ |
| CDeviceHistory | Monitor\DeviceODBC\ |
| CDeviceInfoData | Monitor\DeviceODBC\ |
| CHWaccess | Monitor\HWaccess\Access\ |
| CSNMPAccess | Monitor\HWaccess\Access\ |
| CHTTPAccess | Monitor\HWaccess\Access\ |
| CSNMP | Monitor\HWaccess\SNMP\ |
| CSNMPSession | Monitor\HWaccess\SNMP\ |
| CHTTP | Monitor\HWaccess\HTTP\ |
| CHTTPSession | Monitor\HWaccess\HTTP\ |

%m2_ClassStructFunctionDecl
1800

Function Table

| Class or Structure Name | Function Name | Function Declaration |
|---|---|---|
| CHTMLTextProcessor | CHTMLTextProcessor<br>~CHTMLTextProcessor<br>setLine<br>obtainStateAndValue<br><br>replaceText<br><br>removeLeadingWhiteSpace<br>removeTrailingWhiteSpace<br>processStartState | CHTMLTextProcessor()<br>~CHTMLTextProcessor()<br>setLine(std::string& in_sLine)<br>EReturnState<br>obtainStateAndValue(CHTMLTextProcessor::EHTMLState<br>& out_HTMLState, std::string& out_sValue)<br>void replaceText(std::string& inOut_sText, std::string&<br>in_sSearch, std::string& in_sReplace);<br>void removeLeadingWhiteSpace(std::string& inOut_sLine)<br>void removeTrailingWhiteSpace(std::string& inOut_sLine)<br>void processStartState(char in_cChar) |

| | Function Name | Function Declaration |
|---|---|---|
| SHTMLText | SHTMLText<br>~SHTMLText<br>getHTMLText<br>setHTMLText | SHTMLText()<br>~SHTMLText()<br>std::string getHTMLText(std::string in_sData)<br>void setHTMLText(std::string in_sData) |

FIG. 18A

Class Specification
1802

5.6.4.5   CHTMLTextProcessor Class Specification 5.6.4.5.1   Function List
public:
```
CHTMLTextProcessor();
~CHTMLTextProcessor();
void setLine(std::string& in_sLine);
EReturnState obtainStateAndValue(CHTMLTextProcessor::EHTMLState& out_HTMLState,
std::string& out_sValue);
void replaceText(std::string& inOut_sText, std::string& in_sSearch, std::string&
in_sReplace);

private:
void removeLeadingWhiteSpaces(std::string& inOut_sLine);
void removeTrailingWhiteSpaces(std::string& inOut_sLine);
void processStartState(char in_cChar);

struct SHTMLText {
public:
    SHTMLText();
    ~SHTMLText();
    std::string getHTMLText(std::string in_sData);
    void setHTMLText(std::string in_sData);
    std::string m_sData;
private:
};
```

FIG. 18B

%m1_AbsTargetPathForClassStrctTable
2100

| Class or Structure Name | Absolute Directory Path |
|---|---|
| CTimer | /CodeDir/Timer/ |
| CTimerSystemRegistry | /CodeDir/Timer/ |
| CMonitorService | /CodeDir/MonitorService/ |
| SKeyValueInfo | /CodeDir/Monitor/ |
| CMonitorManager | /CodeDir/Monitor/MonitorManager/ |
| CDeviceFactory | /CodeDir/Monitor/Device/ |
| CDevice | /CodeDir/Monitor/Device/ |
| CDeviceODBC | /CodeDir/Monitor/DeviceODBC/ |
| CDeviceHistory | /CodeDir/Monitor/DeviceODBC/ |
| CDeviceInfoData | /CodeDir/Monitor/DeviceODBC/ |
| CHWaccess | /CodeDir/Monitor/HWaccess/Access/ |
| CSNMPAccess | /CodeDir/Monitor/HWaccess/Access/ |
| CHTTPAccess | /CodeDir/Monitor/HWaccess/Access/ |
| CSNMP | /CodeDir/Monitor/HWaccess/SNMP/ |
| CSNMPSession | /CodeDir/Monitor/HWaccess/SNMP/ |
| CHTTP | /CodeDir/Monitor/HWaccess/HTTP/ |
| CHTTPSession | /CodeDir/Monitor/HWaccess/HTTP/ |

FIG. 21A

| %m1_FileClassStrctTable 2200 ||
| --- | --- |
| Filename | Class or Structure Name |
| cTimer.htm | CTimer |
| cTimerSystemRegistry.htm | CTimerSystemRegistry |
| cMonitorService.htm | CMonitorService |
| sKeyValueInfo.htm | SKeyValueInfo |
| cMonitorManager.htm | CMonitorManager |
| cDeviceFactory.htm | CDeviceFactory |
| cDevice.htm | CDevice |
| cDeviceODBC.htm | CDeviceODBC |
| cDeviceHistory.htm | CDeviceHistory |
| cDeviceInfoData.htm | CDeviceInfoData |
| cHWaccess.htm | CHWaccess |
| cSNMPAccess.htm | CSNMPAccess |
| cHTTPAccess.htm | CHTTPAccess |
| cSNMP.htm | CSNMP |
| cSNMPSession.htm | CSNMPSession |
| cHTTP.htm | CHTTP |
| cHTTPSession.htm | CHTTPSession |

FIG. 22A

DATA STRUCTURE USED FOR DIRECTORY STRUCTURE NAVIGATION IN A SKELETON CODE CREATION TOOL

RELATED APPLICATIONS AND CLAIM OF PRIORITY

This application is a continuation of and claims priority to U.S. patent application Ser. No. 10/652,602 now issued as U.S. Pat. No. 7,308,675, filed on Aug. 28, 2003, entitled "Data Structure Used For Directory Structure Navigation In A Skeleton Code Creation Tool", naming Tetsuro Motoyama and Avery Fong as inventors, the content of which is hereby incorporated by reference in its entirety for all purposes.

This patent application is related to U.S. patent application Ser. No. 10/059,694 now issued as U.S. Pat. No. 7,406,432, filed on Jan. 28, 2002, entitled "Project Management Over A Network With Automated Task Schedule Update", naming Tetsuro Motoyama as inventor.

This patent application is also related to U.S. patent application Ser. No. 10/313,158 now issued as U.S. Pat. No. 7,171,652, filed on Dec. 6, 2002, entitled "Software Development Environment with Design Specification Verification Tool," naming Tetsuro Motoyama and Avery Fong as inventors, which is a continuation-in-part of and claims priority to U.S. patent application Ser. No. 09/881,250 now issued as U.S. Pat. No. 7,191,141, filed on Jun. 13, 2001, entitled "Automated Management of Development Project Files Over a Network," naming Tetsuro Motoyama as inventor.

This patent application is also related to U.S. patent application Ser. No. 10/652,603 now issued as U.S. Pat. No. 7,793,257, filed on Aug. 28, 2003, entitled "Technique for Automating Code Generation in Developing Software Systems," naming Tetsuro Motoyama and Avery Fong as inventors.

This patent application is also related to U.S. patent application Ser. No. 10/652,715 now issued as U.S. Pat. No. 7,237,224, filed on Aug. 28, 2003, entitled "Data Structure Used for Skeleton Function of a Class in a Skeleton Code Creation Tool," naming Tetsuro Motoyama and Avery Fong as inventors.

This patent application is also related to U.S. patent application Ser. No. 10/785,858, filed on Feb. 23, 2004, entitled "Techniques And Data Structures For Automating Code Generation For Software System" naming Tetsuro Motoyama as inventors.

This patent application is also related to U.S. patent application Ser. No. 10/785,329, filed on Feb. 23, 2004, entitled "Techniques And Data Structures For Automating Code Generation For Software Systems" naming Tetsuro Motoyama as inventors.

FIELD OF THE INVENTION

The present invention relates to automatic code generation for software systems. In particular, the present invention relates to a system and method for automatically generating code for a software system based on a design specification.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Development of software systems is often a large undertaking for businesses. Often, developers create documents that specify how the software system should be developed. These documents may include explanations, figures, flow charts and other expressions of ideas regarding requirements, implementation, execution or use of the software system. The specification may also include documents that specify specific programming aspects of the software system. These program aspects include, for example, naming and defining software classes, function declarations, relationship of software classes to one another, specific comments that are to be placed in program files. By specifying this information on the developer side, one result that is achieved is that different portions of the overall software system may be better inter-related with one another.

Developers often adhere to a convention or a set of guidelines in how certain types of information are presented in the specification for the software system. This forces programmers to follow a convention that is understood by all of the developers and programmers that work on the software system.

Despite using a software design specification with guidelines, creating code files based on the design specification is often tedious and labor intensive. Typically, programmers manually refer to the design specification continuously while entering code. Certain programming tasks, such as function declarations and listing class attributes, require the programmer to go back and forth between the specification and the program files in order to write the correct syntax for the code that corresponds to the function declarations and class attributes. Often, the programmer must also structure the program files that are created according to what is provided or otherwise specified in the design specification. This is also a labor intensive task, as the program files can have long directory paths that are at least partially based on a corresponding directory path in the software design specification.

Based on the foregoing, an approach for developing software code that does not suffer from the limitations of prior approaches is highly desirable.

SUMMARY OF THE INVENTION

An approach is provided to facilitate the creation of a software system by automating the generation of at least a portion of the program code in the software system. The generation of program code may be automated based on a software design specification. According to one aspect of the invention, a specification that describes how a software system is to be designed is scanned. Certain designated characteristics of the specification may be detected during the scan. Based on the designated characteristics, at least a portion of the program code for implementing the software system is automatically generated. The approach can significantly reduce the time required by skilled programmers to develop the program code for the software system based on the design specification and also reduce errors in the software system.

BRIEF DESCRIPTION OF THE DRAWINGS

The present invention is depicted by way of example, and not by way of limitation, in the figures of the accompanying drawings and in which like reference numerals refer to similar elements and in which:

FIGS. 15A-15D depict hash tables for use in automatically generating code, according to an embodiment of the invention;

FIG. 16A depicts another type of hash table for use in automatically generating code, according to an embodiment of the invention;

FIG. 18A depicts another of hash table for use in automatically generating code, according to an embodiment of the invention;

FIG. 18B depicts an example class specification of the software design specification that corresponds to the hash table of FIG. 18A;

FIG. 21A depicts another of hash table for use in automatically generating code, according to an embodiment of the invention;

FIG. 22A depicts another of hash table for use in automatically generating code, according to an embodiment of the invention;

DETAILED DESCRIPTION OF THE INVENTION

A technique for automating code generation in developing software systems is described. In the following description, for the purposes of explanation, numerous specific details are set forth in order to provide a thorough understanding of the present invention. It will be apparent, however, that the present invention may be practiced without these specific details. In other instances, well-known structures and devices are depicted in block diagram form in order to avoid unnecessarily obscuring the present invention.

Overview

Embodiments of the invention facilitate the creation of a software system by automating the generation of some of the program code that is necessary for the software system. The generation of program code may be automated based on a software design specification. As described herein, embodiments of the invention may significantly reduce the time required by skilled programmers to develop the program code for the software system based on the design specification.

In one embodiment, a specification that describes how a software system is to be designed is scanned. Certain designated characteristics of the specification may be detected during the scan. Based on the designated characteristics, at least some of the program code for implementing the software system is automatically generated.

Embodiments provided herein enable certain tasks of programmers to be automated. These tasks may pertain to the generation of skeleton code for software classes and structures of the design specification. By automating the generation of skeleton code, the amount of time required from the skilled programmer is greatly reduced. The possibility that human error will cause bugs or compilation errors in the software system is also reduced by automating the generation of skeleton code.

TERMINOLOGY

The term "code" refers to syntax that is interpreted as instructions when a file containing that syntax is compiled.

The term "skeleton code" refers to a set of code that by itself is incomplete for purposes of performing a desired task, even though the skeleton code may be compiled.

The term "hash table" is a data structure that contains key-value pairs.

The term "module" refers to software, hardware, firmware, or any combination thereof, for performing a stated function. A module may be provided as one component or contained in one process. Alternatively, a module may be distributed amongst multiple components and/or processes.

The term "package" refers to a software component that includes one or more classes working together to perform a task.

The term "class" or "software class" refers to a set of code that can be executed to perform a stated function. For purposes of this application, a "structure" is assumed to be a type of software class, unless otherwise stated.

Functional Description

Figure 1:
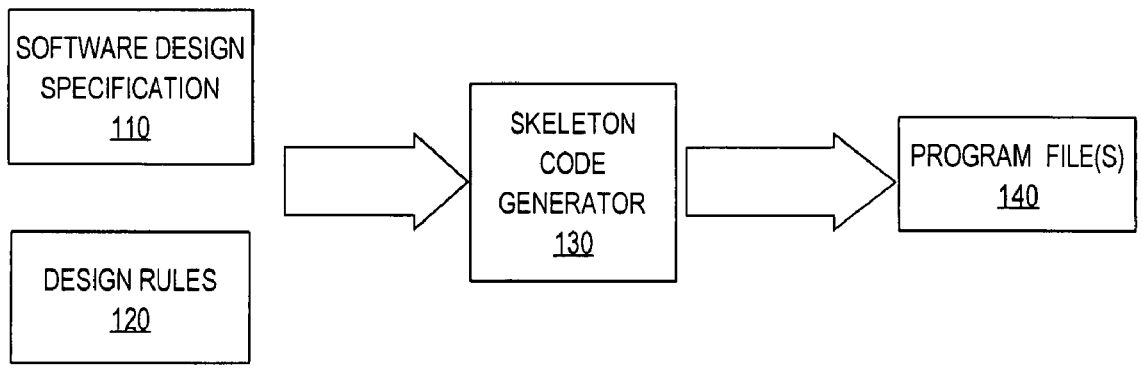
FIG. 1 is a block diagram of a system for generating code, according to an embodiment of the invention.

FIG. 1 is a block diagram that depicts a system for generating code, according to an embodiment of the invention. A skeleton code generator 130 is configured to generate code that is later compiled and executed as part of a software system. The code may be packaged into files. In one embodiment, the code that is generated is skeleton code. Files containing the skeleton code may require additional code and/or edits, in order to compile and/or function properly.

In FIG. 1, a software design specification 110 defines a software system and enables programmers to create program files for the software system. Input for the skeleton code generator 130 may include a software design specification 110 and design rules 120. The output of the code generator may include one or more program files 140. As will be described, the program files 140 may be generated and organized according to some structure, such as in the form of a directory. A specific output directory that can be created according to an embodiment is described hereinafter with reference to FIG. 6.

Once completed, the software system may comprise modules and software classes that are based on an overall design and organization. The software design specification 110 is a compilation of documents that together define and/or explain the modules and software classes. In particular, the software design specification 110 may define programming aspects of software classes that form the software system. In one embodiment, the software design specification 110 is a compilation of electronic documents. The electronic documents may be in the form of Hypertext Markup Language (HTML), eXtensible Markup Language (XML), or any other format that provides tags or other markers. It is also possible for the electronic documents to be text files that contain detectable characters.

The design rules 120 contains a set of rules that can be used by the skeleton code generator 130 to inspect the software design specification 110 for aspects that define the software classes, components thereof, or are otherwise to be included in the software system. The set of design rules may be provided by the developers. Thus, it is possible for the design rules 120 to at least be partially defined by the software design specification 110. For example, the software design specification 110 may specify the manner in which the software design specification 110 is to be inspected or interpreted. It is also possible for the set of design rules 120 to be at least partially integrated with the skeleton code generator 130.

The program files 140 that are generated by the skeleton code generator 130 form components of the software architecture. The program files 140 may contain code that subsequently can be executed to perform the functions or tasks specified for the software system.

In one embodiment, the skeleton code generator 130 uses the design rules 120 to scan the software design specification 110 to detect characteristics of elements that are to be provided in the completed software system. Example elements include, without limitation, classes, functions, class attributes, comments, and file headers. In order to scan the software design specification 110, the skeleton code generator 130 is configured to detect the characteristics in the software design specification 110 that correspond to such elements. For example, the skeleton code generator 130 may be configured to associate certain tags or characters with classes, class attributes, function declarations, or comments. As a specific example, the skeleton code generator 130 may detect the capital letter "C" at the beginning of a word, and interpret the character as the beginning of a software class specification. As another example, the character "/" may denote the beginning or end of a comment for a computer program.

In one embodiment, program files 140 that are generated by skeleton code generator 130 contain skeleton code. The skeleton code of program files 140 can be compiled and executed, but will not perform the desired function without a programmer adding additional code to perform the desired function. The level of detail at which the code is generated may depend on the specific implementation. In one embodiment, skeleton code generator 130 automates the creation of program files, the creation of headers in the program files, the replication of comments required in the software design specification 110, and the declaration of functions and class attributes as required by the software design specification 110. Still further, as will be described by other embodiments detailed hereinafter, the program files may be placed in a directory structure in a manner specified by the software design specification 110. An output directory where the program files are placed may be generated by skeleton code generator 130. By creating such coded program files 140, embodiments of the invention can conserve resources of highly skilled programmers who would otherwise manually create what the skeleton code generator 130 generates automatically.

Figure 2:
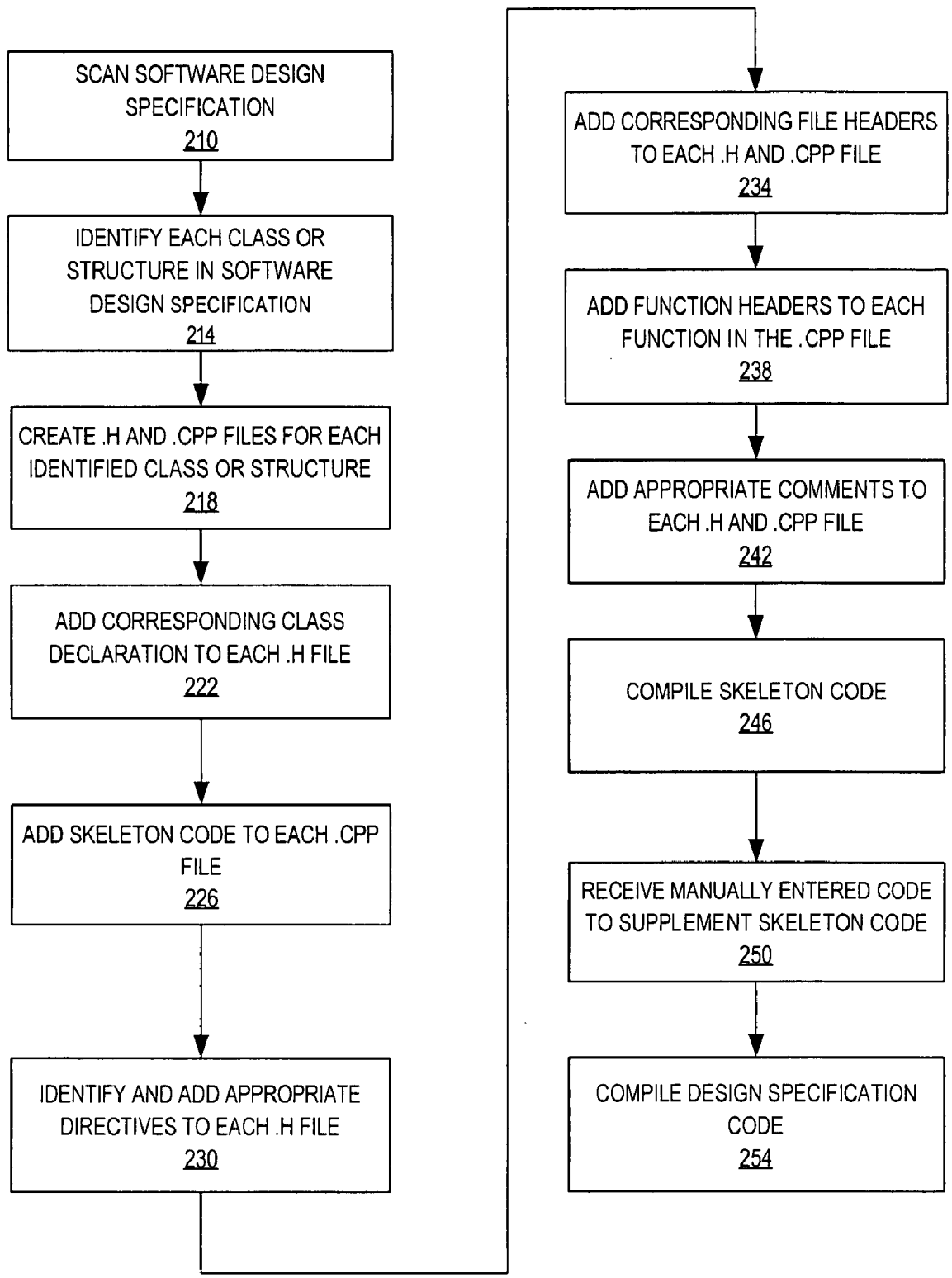
FIG. 2 depicts a detailed method for generating program files manually by a developer.

FIG. 2 depicts a more detailed method for manually generating program files that form part of a software system.

In step 210, the software design specification 110 is scanned. In one embodiment, the software design specification 110 may be scanned for characteristics that are specified by the design rules 120. Examples of such characteristics include, without limitation, tags in HTML documents, or specific characters in text or HTML documents, that designate the location of elements such as class attributes, functions, function declarations, and comments. After the software design specification 110 has been inspected for defects and then published, the code is developed. In one embodiment, the software design specification 110 will contain all, or at least most of the information needed to generate the code for each class and structure of the design specification. The software design specification 110 may be scanned in association with the creation of the workspace where the code will be developed based upon the software design specification 110. The workspace will vary depending upon the code development tool used. Microsoft's Visual Studio NET and SunSoft's Sun Workshop are examples of code development tools for the C++ programming language.

Step 214 provides that the classes defined in the software design specification 110 are identified. In addition, if the software design specification 110 defines structures, the structures are also identified. In one embodiment, software classes or structures are detected by inspecting the software design specification 110 for tags or characters that contain "C", because, as design rules 120 may specify, the appearance of this character at the beginning of a word or string is designated to delineate a class or structure.

According to one embodiment, for each detected class, step 218 provides that two program files containing skeleton code are created. A first program file corresponds to a declaration file, and a second program file corresponds to an implementation file. The declaration file contains the declaration for that class. The implementation file contains the function definitions of a class identified from the software design specification 110. With embodiments such as described, the declaration file may be identified as having a .h extension, and the implementation file may be identified as having a .cpp extension.

Step 222 provides that skeleton code is added to the declaration file. In one embodiment, this skeleton code includes at least some instructions for declaring the functions and the class attributes for the class identified from the software design specification 110. The programming syntax may also be used for creating file headers and function headers.

Step 226 provides that skeleton code is added to the implementation file. This skeleton code may include instructions that, when the file is completed, are for executing functions and for returning values when functions are executed. With each implementation file, the skeleton code for each function may also include statements for debugging purposes and a statement to return a value if the function returns a value.

In step 230, appropriate directives are added to the declaration file created for each class that is identified from the software design specification 110. A class may require the use of other classes. The class that uses the other class needs to "include" the other class ("included class"). For a class to include other classes, the class must know the path to the other classes (the path to the declaration file of the other classes, more specifically). A directive can be used to allow a class to include other classes that it uses. The directive indicates the path to other classes. The path may define the location of a particular file within an output directory such as described in FIG. 6. The included classes must be declared before a class can use it. By adding a directive to indicate the path to the included classes, the class will know how the included classes are declared. Thus, in order to add directives to the declaration file, all the classes of software design specification 110 and the location of their declaration files need to be identified so that the path to the class may be known. The manner in which the included classes are detected may be the same as how all classes are identified. In one embodiment, a particular character or tag is identified that delineates a class (e.g. "C").

In step 234, a file header is added to each of the program files. The file header documents the file and the class for which the code is written. As with other syntax, the skeleton code generator 130 may be used to automatically generate the header for each program file.

Step 238 provides that a function header is provided to each function in the implementation file. The function header may document and refer to a description that the algorithm or the function performs when executed in the particular implementation file.

Step 242 provides that non-programming syntax, such as comments, are provided in the declaration and implementation files. In one embodiment, comments added to each type of programming file are replicated, or otherwise based on sections of software design specification 110 that are designated as being comments for subsequent program files. Thus, step 242 may include copy and paste operations to copy comments from the software design specification 110 to the program files.

In step 246, the skeleton code provided in the declaration and implementation files is added to the workspace of a code development tool and then compiled. Compilation errors may indicate defects in the design specification. If so, the defects in the design specification are corrected and the skeleton code is re-generated accordingly.

Once the skeleton code is compiled, additional code may be manually added to each implementation file in step 252. In step 254, the files are re-compiled with the manually entered code.

The steps of the method described in FIG. 2 may be performed automatically using the skeleton code generator 130 and the information in the design specification. Also, the recited steps may be performed in any order since they involve writing information into a file before the workspace is compiled.

Among other benefits of automating the steps of the method in FIG. 2 is reducing the time needed for developing the code based on the contents of the software design specification 110. Furthermore, an embodiment such as described in FIG. 1 eliminates human error in generating the skeleton code.

Output Directory

According to an embodiment of the invention, an output directory is created to structure skeleton code and related data generated from the software design specification 110. The structure of the output directory may be specified by the directory structure of the software design specification 110. The software design specification 110 may either specify what the structure of the output directory should be, or the software design specification 110 may itself be structured into a directory. In this way, the software design specification directory may form the basis of the output directory's structure.

In one application, the software design specification directory contains electronic documents that describe various aspects of the desired software system. The software design specification 110 may describe and/or define modules that form a first layer of division within the directory, and classes that form internal layers of the modules within the directory. Thus, the software design specification 110 may correspond to a directory, where nodes of the directory correspond to modules, sub-modules and classes. In one embodiment, the program files created by the skeleton code generator 130 are automatically structured into an output directory. The output directory may be modeled after the directory structure of the software design specification 110. Thus, the output directory may contain structures of nodes that resemble a corresponding configuration of the directory of the software design specification 110.

Figure 3:
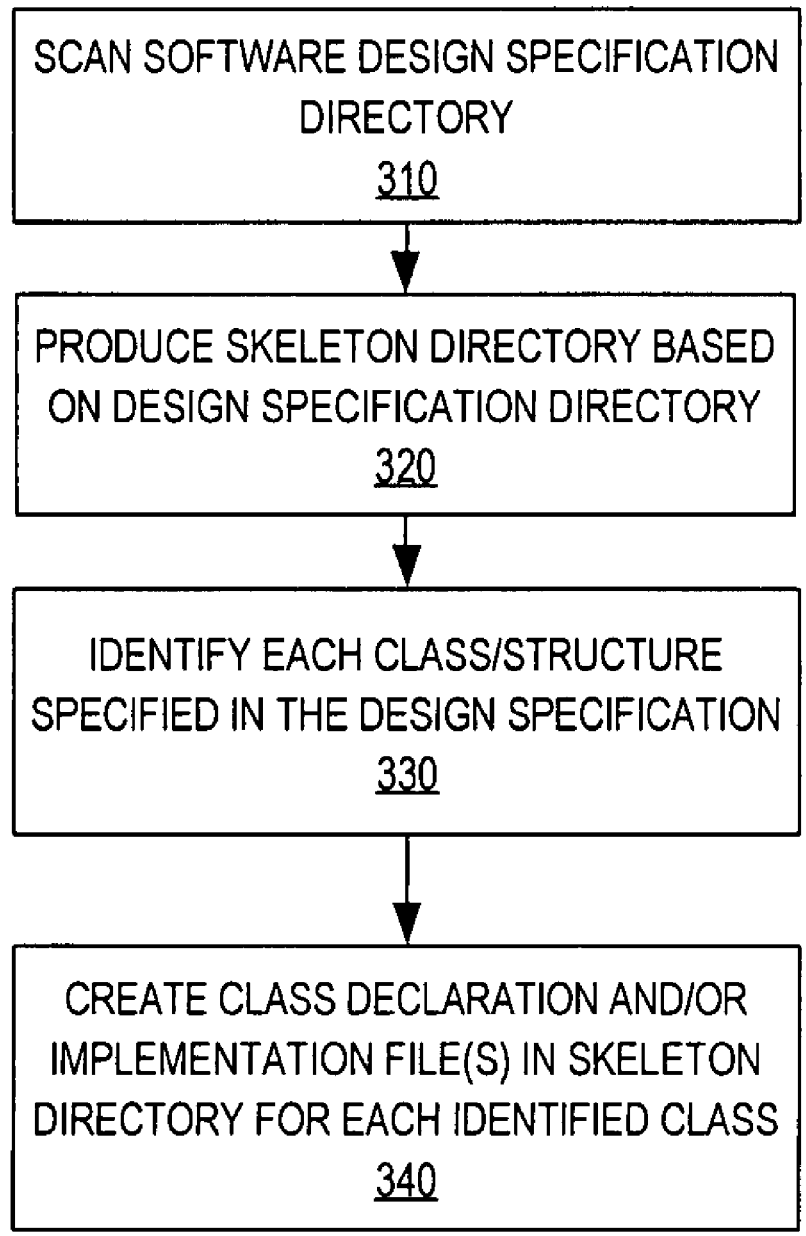
FIG. 3 depicts a basic method where generated program files are organized using an output directory, according to one embodiment of the invention.

FIG. 3 depicts a basic method where generated program files are organized using an output directory, according to one embodiment of the invention. In describing FIG. 3 and FIG. 4, reference may be made to elements of other figures in this application. Any such reference is made for illustrative purposes only.

Step 310 provides that the software design specification directory is scanned one or more times. The scan of the software design specification directory identifies the placement of nodes and internal nodes in that directory. In performing a method such as described in FIG. 3, an assumption is that the developers will want the program files created by the skeleton code generator 130 structured into an output directory that is at least partially duplicative of the software design specification directory. Alternatively, the output directory is based on some other description, such as a published guideline with the software design specification 110.

In step 320, a skeleton output directory is created based on the software design specification directory. The skeleton output directory contains node structures that duplicate corresponding node structures in the software design specification directory. In one embodiment, all branch nodes except the "root node" of the software design specification directory are duplicated with the same structure in the output directory. A different root node is used for the output directory in order for the output directory and the software design specification directory to be separately addressable.

In step 330, the classes and structures that are defined in whole or in part, or otherwise described in the software design specification 110, are located by scanning the software design specification 110. Whereas scanning the software design specification directory locates and identify the node structure of the software design specification directory, scanning the software design specification 110 locates and identifies the classes and structures of the software design specification 110 as well as locates and identify the node structure of the software design specification directory. In one embodiment, an attempt is made to identify each class or structure that is mentioned in the software design specification 110. This task may be performed by recognizing a convention by which structures and classes are mentioned in the software design specification 110. The convention may be defined by design rules 120, accessible to skeleton code generator 130. For example, skeleton code generator 130 may use rules specified from design rules 120 to identify classes and structures from the software design specification 110.

Once such classes and structures are identified, one embodiment provides that, in step 340, the program files are placed within branch nodes of the output directory that corresponds to a branch node in the software design specification directory where the class or structure was located in the software design specification 110. In one embodiment, for each identified class or structure, two program files are generated and placed in the branch node of the output directory. The two program files may correspond to a declaration file and an implementation file.

Figure 4:
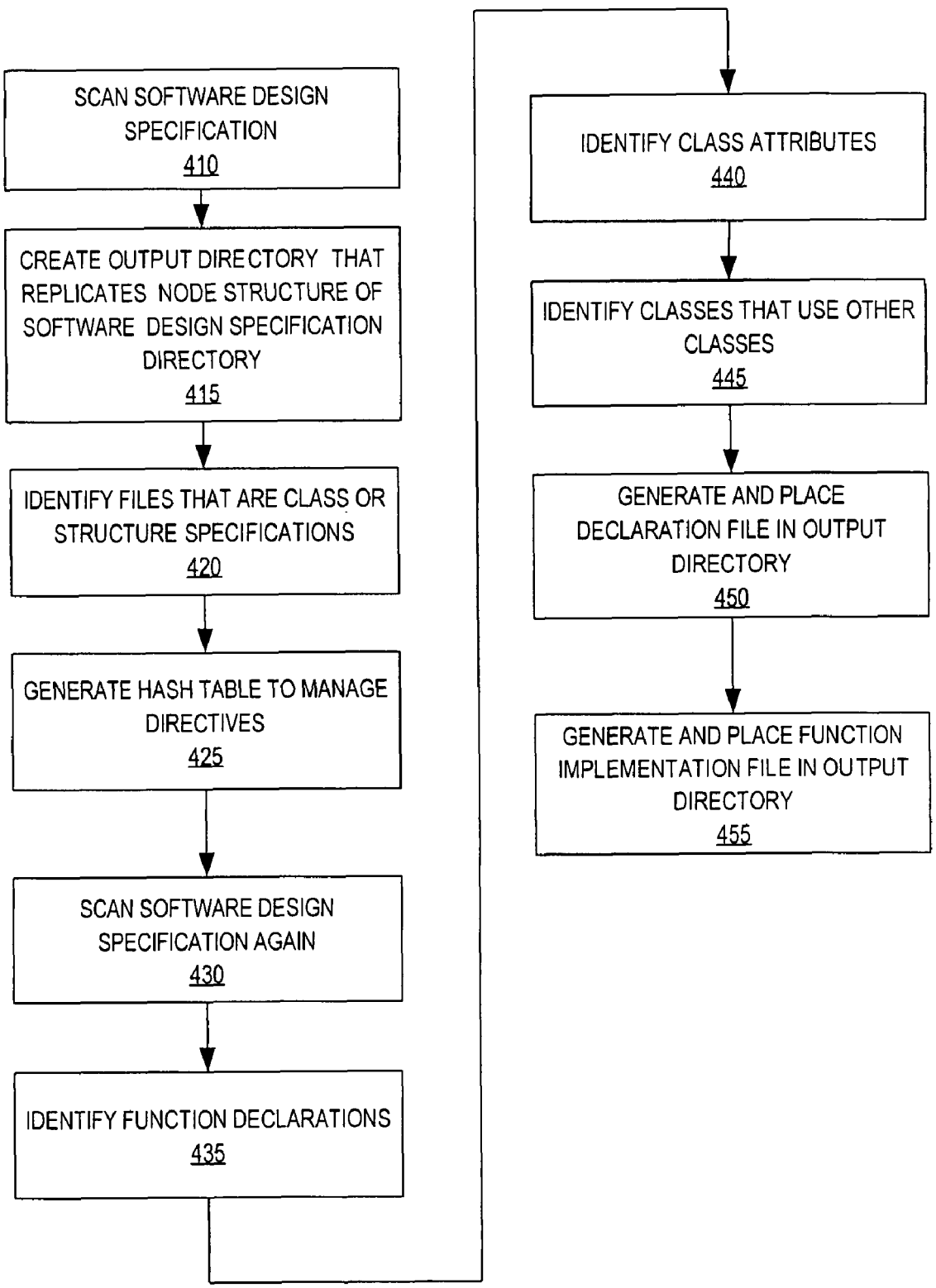
FIG. 4 depicts a more detailed method for generating an output directory with program files containing skeleton code.

FIG. 4 depicts a more detailed method for generating an output directory with program files containing skeleton code, according to an embodiment. Step 410 provides that the software design specification 110 is scanned a first time in order to obtain basic directory information, such as described in steps 415-425.

Step 415 provides that an output directory is created that replicates at least a portion of the node structure of the software design specification directory. As described in FIG. 3, one embodiment provides that all of the nodes in the design specification directory are replicated in the output directory except for the root node, which is different.

In step 420, electronic documents or files of the software design specification 110 are inspected to determine where classes or structures are specified. If the software design specification 110 includes documents formatted with tags or coding, such as HTML, the presence of certain tags or coding may signify the presence of a specification for a particular class or structure.

Step 425 provides for maintaining the location of identified classes or structures in a data structure such as a hash table. Embodiments of the invention employ hash tables having a first column corresponding to a key and a second column corresponding to a value associated with that key. In one embodiment, each identified class or structure is a key for a hash table, and the directory path of the class or structure within the software design specification directory is the value for that key. In this way, the directory path of a class or structure identified in the previous step is recorded in the hash table as the value of a particular class. A hash table suitable for use with an embodiment such as described is depicted in FIG. 15A.

In step 430, the software design specification 110 is scanned a second time to obtain more detailed information for creating the program files. Steps 435-445 are performed with the second scan of the software design specification 110. In the second scan, the function declarations are identified in step 435. Step 440 provides that class attributes are identified in the software design specification 110. The function declarations and class attributes may be defined within certain electronic documents of the software design specification 110, and specifically within portions of the software design specification that correspond to class definitions. The specific markers that are to delineate functions and class attributes in the software design specification may be defined by the design rules 120.

Step 445 provides that during the second scan of the software design specification 110, classes ("included classes") that are used by a class are identified, and the directory of the included classes are recorded in the hash table. The specification of each class or structure in the software design specification 110 may contain or refer to another class or structure. Only classes referred to by a class are included classes.

Classes contained within a class are nested classes. A nested class contains the declaration of the class within the class in which it is nested. When a class or structure specification is identified in the scan of the software design specification 110, it is checked to determine whether it is nested within another class or structure. For example, a class specification may appear as a class specification that is indented on an electronic document within another class specification. Thus, the indent (or other marker) may indicate that the identified class is nested in another class specified in that same electronic document. When a class or structure is identified in the scan of the software design specification 110, it is checked to determine whether it is referred within another class or structure to see if it needs to be included by the class. For example, the class may be identified by a tag or coding on an electronic document within the class specification. The included classes need to be identified for a class. Step 445 provides that both the class and the directory path of the identified included class are recorded in a hash table.

Steps 450 and 455 provide for generating program files and placing the program files in nodes of the output directory that have corresponding nodes in the directory of the software design specification 110. In step 450, the function declaration file is generated and placed in the output directory. In step 455, the implementation file is generated and placed in the output directory.

Figure 5:
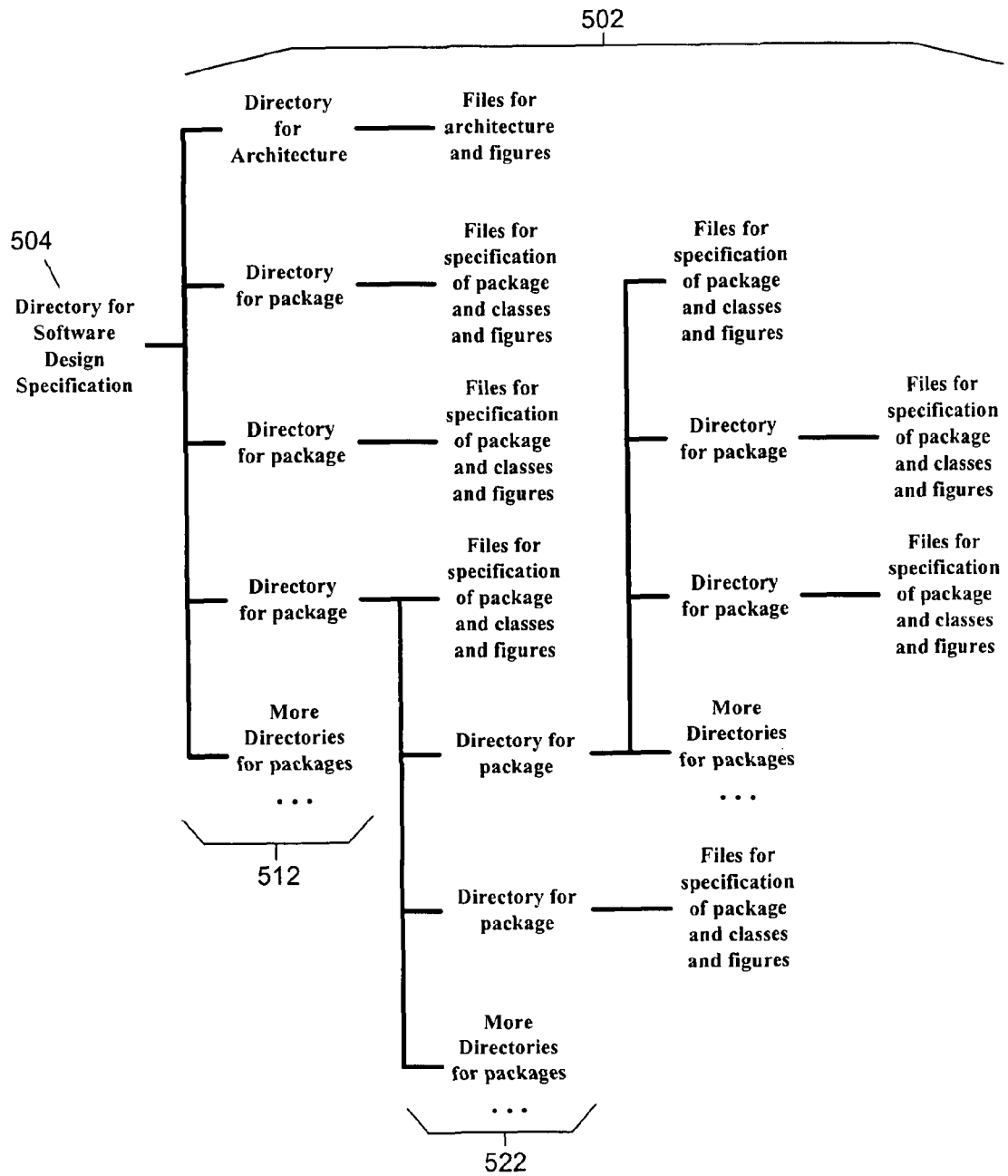
FIG. 5 depicts a software design specification for use with an embodiment of the invention.

FIG. 5 depicts an example software design specification directory 502 for use with an embodiment of the invention. The software design specification directory 502 structures and organizes files that are part of the software design specification 110 for the software system. The software design specification 110 includes files that are contained in the software design specification directory 502. The software design specification directory 502 contains a first layer 512 of sub-directories. The sub-directories correspond to packages of the overall software architecture. Internal layers 522 of the first layer 512 contain files within the software design specification directory 502. The files may contain descriptions of the software architecture (including figures of the design specification), packages, and classes. The software design specification directory 502 is identified by a root node 504 (Directory for Software Design Specification), and this node is the top directory that contains the entire software design specification 110 beneath it.

The software design specification directory 502 contains sub-directories with names corresponding to the names of the packages or architecture. The files in the software design specification directory 502 for the software system contain descriptions and figures. The files in the software design specification directory 502 for packages contain description of the packages, description of the classes in the packages, and/or figures describing the packages and classes. Within the software design specification directory 502, the directory for a package may also contain directories for other packages. It is possible for a package to contain packages in a software design specification 110.

In one embodiment, the software design specification 110 is published with directories that are structured according to a specific guideline or convention. In this way, the structure of the software design specification directory 502 allows for consistency and uniformity in the software design specification 110 when two or more individuals are creating and integrating their part of the design specification.

In one embodiment, skeleton code generator 130 creates an output directory (see 600 in FIG. 6) based on the structure of the software design specification directory 502. In one embodiment, the output directory mirrors or is substantially similar to the software design specification directory 502. By substantially similar, it is meant that entire sub-directories of the output directory 600 may have identical branch nodes as the software design specification directory 502.

Figure 6:
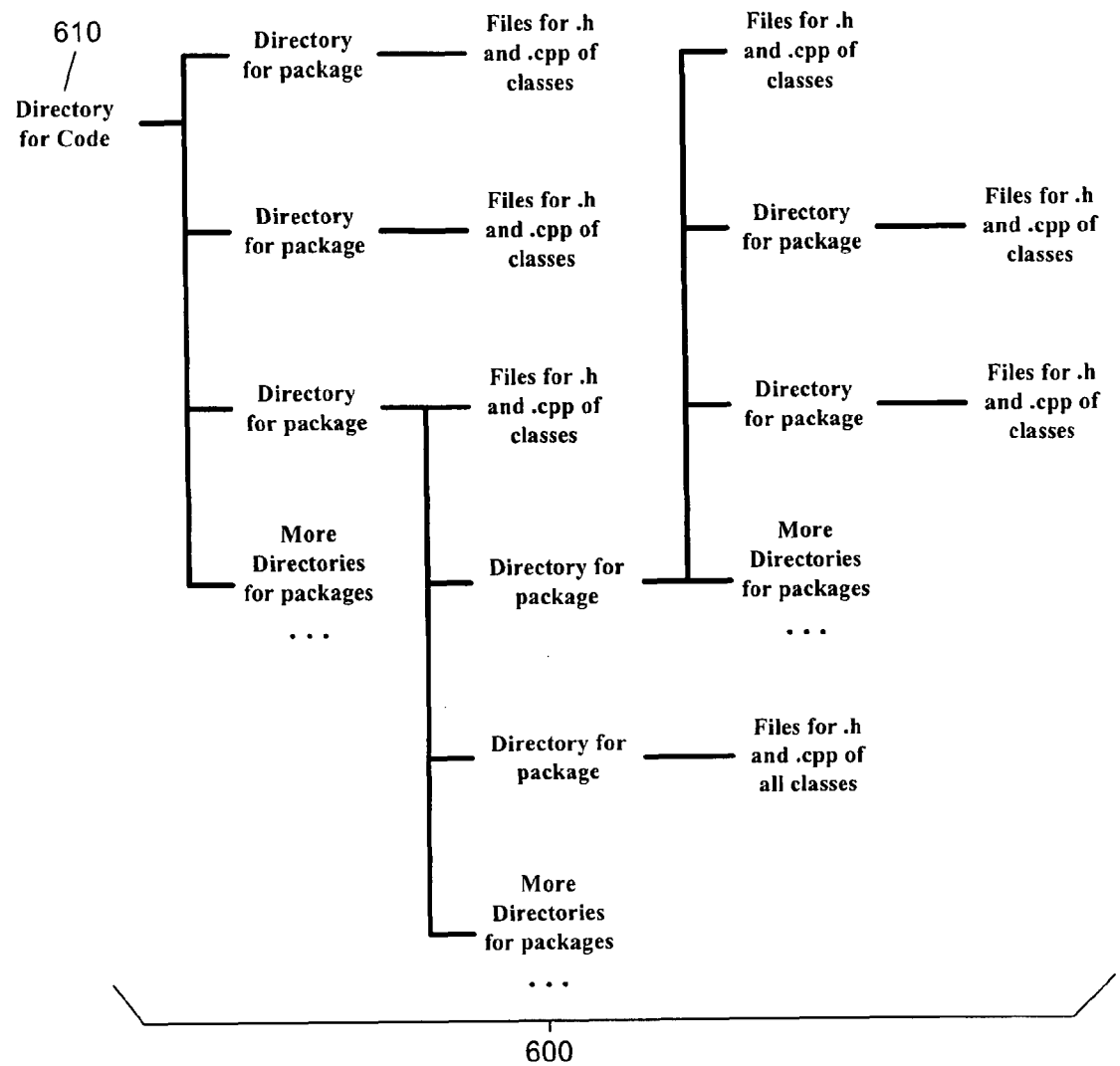
FIG. 6 is a diagram depicting the organization of an output directory that contains different segments of code that are generated from the design specification.

FIG. 6 is a diagram depicting the organization of an output directory 600 that contains different segments of code that are generated by skeleton code generator 130 from software design specification 110. The segments of code may correspond to skeleton code contained in files that may be supplemented with additional code to perform a specified function. The output directory 600 includes sub-directories that correspond to the packages of the system, and to actual program files (such as the .h and .cpp files). The root node 610 (Directory for Code) contains the entire code of the system beneath it. The names of the directories underneath the root node 610 correspond to the names of the packages of the system. The program files provided in output directory 600 contain the class declarations and function definitions of the classes. Except for the top directory, the organization and name of the directories of the output directory 600 mirrors the software design specification directory 502. The organization of the code in the .h and .cpp file follows a specific format (or code convention or rules). Among other advantages, such a format will allow consistency and uniformity in the code when two or more individuals are creating and integrating their part of the code.

While embodiments of the invention described above provide that the output directory 600 is structured based on the software design specification directory 502, alternative sources may be used to structure the output directory 600. For example, according to one embodiment, the software design specification 110 may contain an electronic document that specifies the structure of the output directory 600, so that the actual directory structure of the software design specification 110, if any, is irrelevant. In still another embodiment, a set of rules or other guidelines may be used to structure the output directory 600.

Appendix A depicts an example of a declaration file that can be stored in output directory 600. Appendix B depicts an example of an implementation file that can be stored in output directory 600.

Skeleton Code Generator

Figure 7:
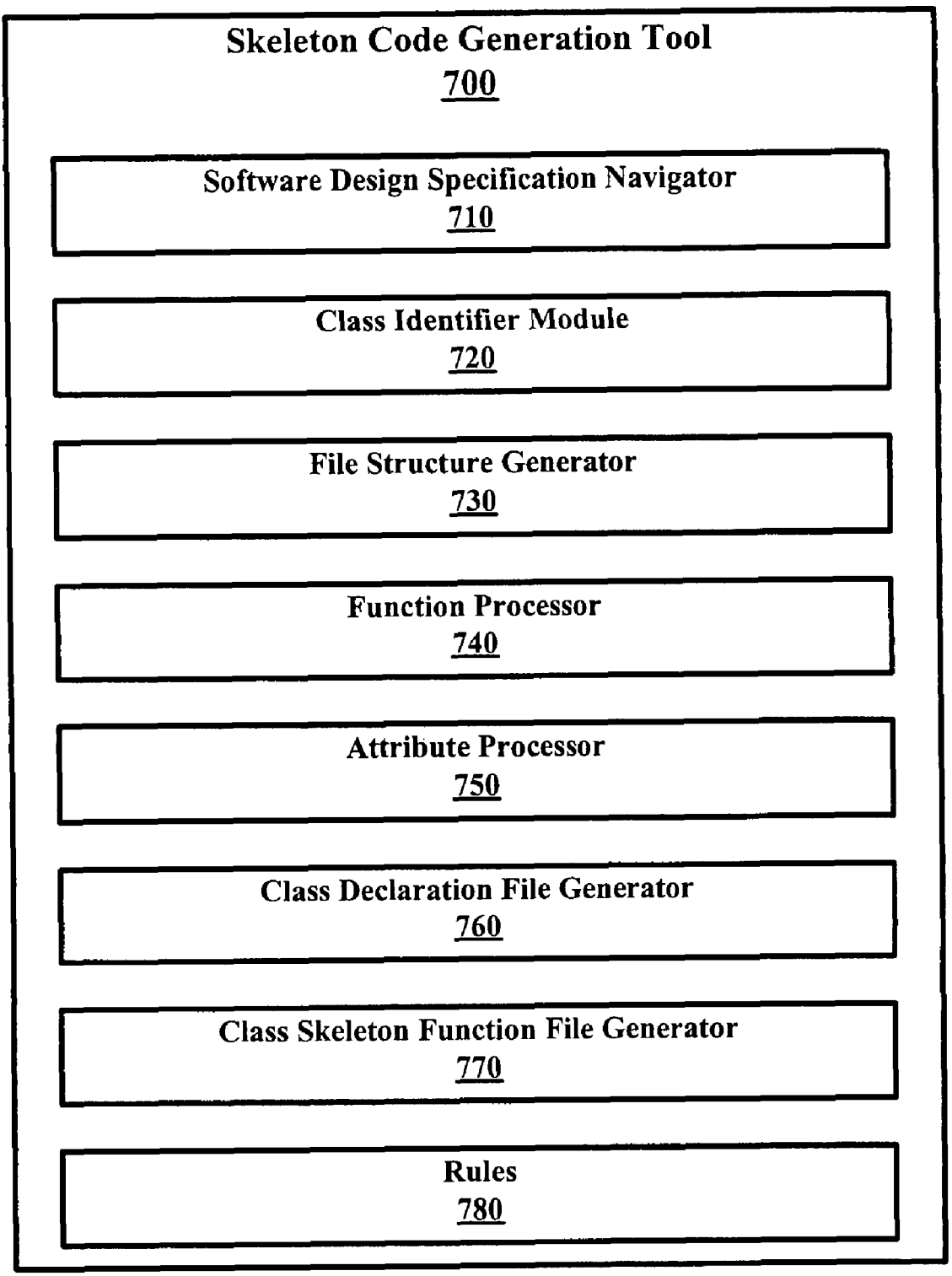
FIG. 7 depicts components of a code generator as configured to generate skeleton code.

FIG. 7 depicts components of skeleton code generator 130 when configured to generate skeleton code, according to an embodiment of the invention. The skeleton code generator 130 is depicted to include a software design specification navigator 710, a class identifier module 720, a file structure generator 730, a function processor 740, an attribute processor 750, a class declaration file generator 760, a class skeleton function file generator 770, and a set of rules 780. Collectively, an embodiment provides that components of the skeleton code generator 130 may combine to scan the software design specification 110, generate files containing the skeleton code of a system, and organize the files in an output directory 600 (see FIG. 6). Each component performs a stated task of the skeleton code generator 130.

In one embodiment, software design specification navigator 710 navigates through the software design specification 110, including any of its directories, to identify files that can be used to generate skeleton code. The software design specification navigator 710 may also navigate through identified files to find distinct portions of the files that are pertinent for generating applicable code.

The class identifier module 720 determines a class associated with a file identified by the software design specification navigator 710 for use in generating skeleton code. In one embodiment, the software design specification 110 defines classes with a class specification, and the class identifier module is configured to detect class specifications. In one embodiment, the class identifier module 720 also obtains information about the identified class from the actual file that contained the specification of the class. The information may be in the form of a text simulation of code, a listing of characteristics or attributes of a class, or any other identifiable text description. Certain text attributes, like the detection of the capital "C", may designate a class specification in the design specification. Text accompanying the class designator may be identified as part of the class specification and/or as information pertaining to the class associated with that class specification.

The file structure generator 730 generates the file structure that will contain the generated skeleton code. Specifically, the file structure generator 730 creates the sub-directories that correspond to the packages, as well as the program files that correspond to the classes of the software design specification 110. Thus, file structure generator 730 creates the branch node structure of the output directory 600, and determines the placement of .h and .cpp files in the branch nodes of the output directory. In one embodiment of the invention, the file structure generator 730 implements a mapping scheme that maps directory paths of nodes in the software design specification directory 502 to nodes of the output directory 600. The file structure generator 730 also maps the location of each class identified by the class identifier module 720 to a corresponding node location within the output directory 600. The node location used by the mapping scheme for a particular identified class may be based on a directory path of the document that specified or otherwise defined that class.

The function processor 740 obtains information about the functions of each class identified by class identifier module 720. The information may be obtained from a function list of that function's class specification. The function processor 740 obtains information about the enumerations, the structures, and the classes declared in the class from the function list in the class specification.

The attribute processor 750 obtains information about the attribute members of each class identified by the class identifier module 720. This information may be obtained from a list of attributes that are contained in the specification for the class. The list of attributes may have a particular format or structure that designate to skeleton code generator 130 that the accompanying text is the list of attributes. The information obtain includes the type and name of the attribute members.

The class declaration file generator 760 generates code for the class declaration. As described in other embodiments, this code may be contained in a .h file. The code may be generated based on the information obtained from the class identifier module 720, the function processor 740, and the attribute processor 750, as well as other components of the skeleton code generator 130.

The class skeleton function file generator 770 generates the skeleton code for each function of the class. As described in other embodiments, this code may be contained in the .cpp file.

FIG. 7 also depicts a set of rules 780 as being part of the skeleton code generator 130. The set of rules 780 may correspond to rules that are part of the design rules 120 (FIG. 1). The set of rules 780 may be based on rules by which the software design specification 110 are formatted and organized. Thus, the set of rules 780 can be used to access the appropriate information from the software design specification 110, as the set of rules 780 will be based on the same convention/rules that were used to create the specification for the classes and functions. Other components of the skeleton code generator 130 can access the set of rules 780 to obtain the information it needs to generate the code.

While components of the skeleton code generator 130 have been described in the context of identifying classes and generating code for classes, other embodiments also provide for identifying structures and generating code for the structures in the same manner as classes.

Figure 8:
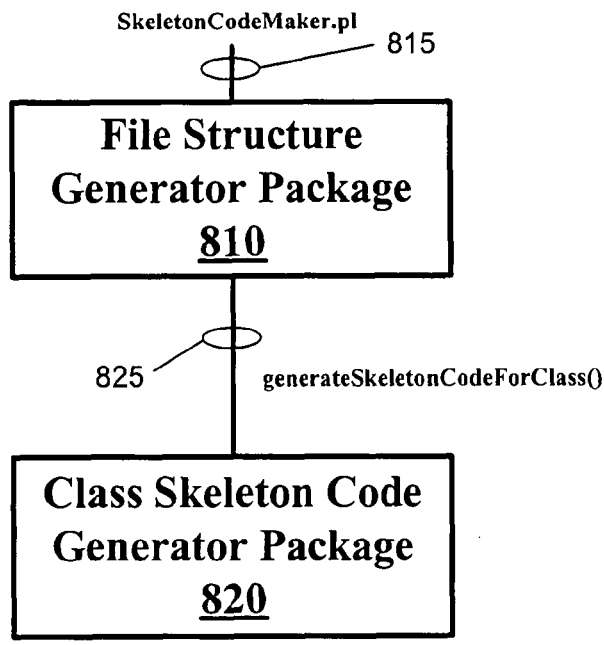
FIG. 8 describes a code generator, as configured to generate skeleton code, in terms of packages and interfaces.

FIG. 8 describes skeleton code generator 130, as configured to generate skeleton code, in terms of packages and interfaces. In one embodiment, skeleton code generator 130 includes a file structure generator package 810 and a class skeleton code generator package 820. Functions of the file structure generator package 810 include creating the directory structure for the skeleton code corresponding to the software design specification 110, and creating the .h and .cpp file for each class identified in the software design specification directory 502. The file structure generator package 810 may include logic/programming to navigate through the software design specification directory 502 in order to obtain information about the classes. This skeleton code is generated based on this information.

The file structure generator package 810 maintains information about the location of the skeleton code for the classes within the output directory 600 (FIG. 6). A first interface 815 (identified as SkeletonCodeMaker.pl) passes information to the file structure generator package 810. This information may include the location (directory path) of the pertinent portions of the software design specification 110, the location (directory path) of the skeleton code to be generated, and the document number of the software design specification 110. The class skeleton code generator package 820 generates the code for the class declaration in the declaration file (.h file) and the skeleton function in the implementation file (.cpp file) for any particular class. The class skeleton code generator package 820 uses information from the specification of the particular class, as provided in the software design specification 110, in order to generate the skeleton code for the class.

A second interface 825, identified by the interface function, generateSkeletonCodeForClass( ), requires information that includes the file handle for the class specification file, the declaration (.h) file, the implementation (.cpp) file, the name of the class, the document number of the software design specification 110, and a hash table containing information about the relative directory path of the class within the software design specification 110. The skeleton code generated for each class has the format described below.

Software Design Specification Contents

Figure 9:
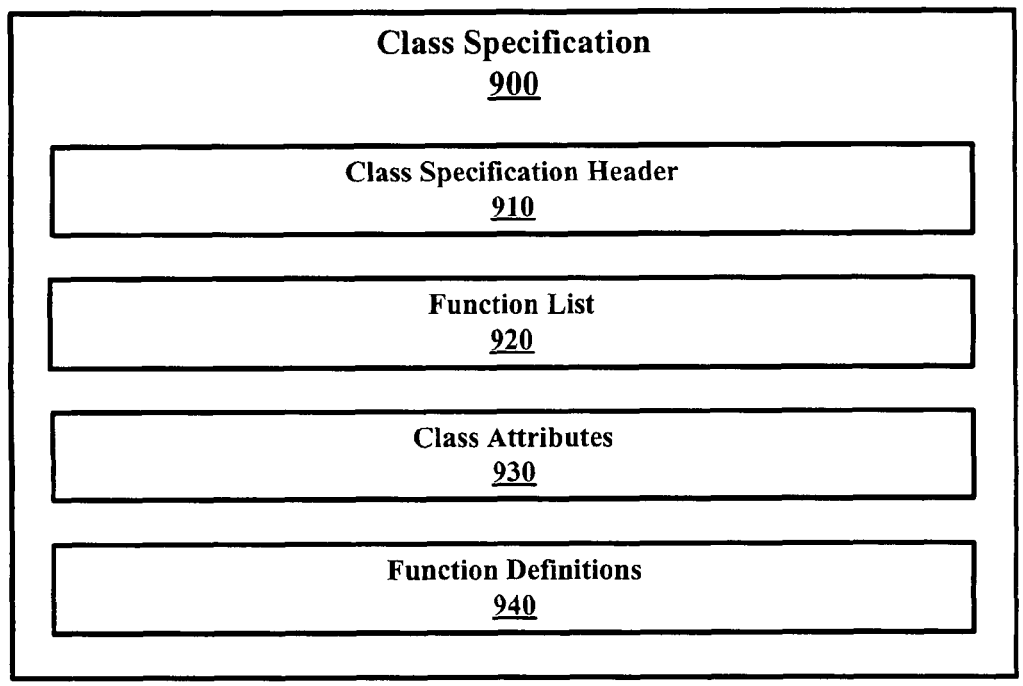
FIG. 9 describes the manner in which a class specification may be provided in the design specification.

FIG. 9 depicts the manner in which a class specification 900 may be provided in the software design specification 110 (see FIG. 1). In one embodiment, the class specification 900 corresponds to a portion of an electronic document that contains information needed to generate the code for a particular class. The information may include characteristics such as a class specification header 910, a function list 920, a set of class attributes 930, and one or more function definitions 940. The class specification header 910 contains the name of the class. The function list 920 contains a list of all the functions of the class. This may include public, protected, and private functions. Appendix C depicts a class specification as it may actually appear.

The function list 920 may also contain all the enumeration declarations, structure declarations, and class declarations declared within the class. The set of class attributes 930 contains a list of all the attribute members of the class. This section gives the type, the name, and the purpose of the attribute members of the class. The function definitions 940 describes the purpose and algorithm used by the functions listed in the function list 920. In one embodiment, the function definitions 940 may be in the form of a comment, or in a comment format, so it may be used as the function header of the function in the code.

In one embodiment, the information corresponding to the characteristics may be delineated from other information through use of character recognition, in conjunction with convention rules that designate certain identifiable text as one of the characteristics of the class specification 900. For example, set of class attributes may be delineated from other information within a portion of the electronic document that is identified as being a class specification by the presence of a grid containing rows and columns.

As described with FIG. 7, class identifier module 720 may detect class specification 900. In identifying class specification 900, class identifier module 720, or some other component of skeleton code generator 130, may be configured to ignore certain types of information contained in the software design specification 110. For example, skeleton code generator 130 may be configured to ignore figures and drawings that describe certain algorithms or processes, because such figures and drawings, as well as accompanying text, are made for human understanding.

Figure 10:
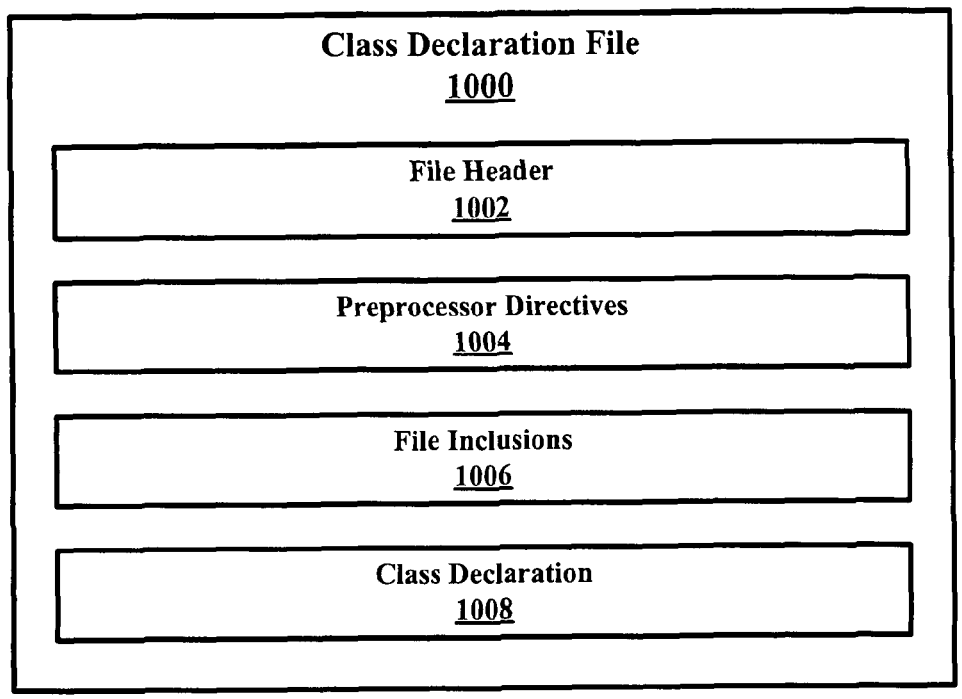
FIG. 10 depicts one format for a class declaration file that is generated to include skeleton code.

FIG. 10 depicts one format for a class declaration file 1000 that is generated to include skeleton code. The class declaration file 1000 corresponds to the .h file for a particular class specification 900, as described elsewhere in this application, for a class of the software design specification 110. The class declaration file 1000 may include a file header 1002, a preprocessor directive 1004, one or more file inclusion 1006, and a class declaration 1008. The file header 1002 may provide a description of the file, class, and/or the history of the file. The preprocessor directive 1004 contains one or more preprocessor directives to prevent multiple inclusion of the particular file when the system is compiled. The file inclusions 1006 includes preprocessor directives that include other files needed by the class. The class declaration 1008 contains the code that declares the class.

Figure 11:
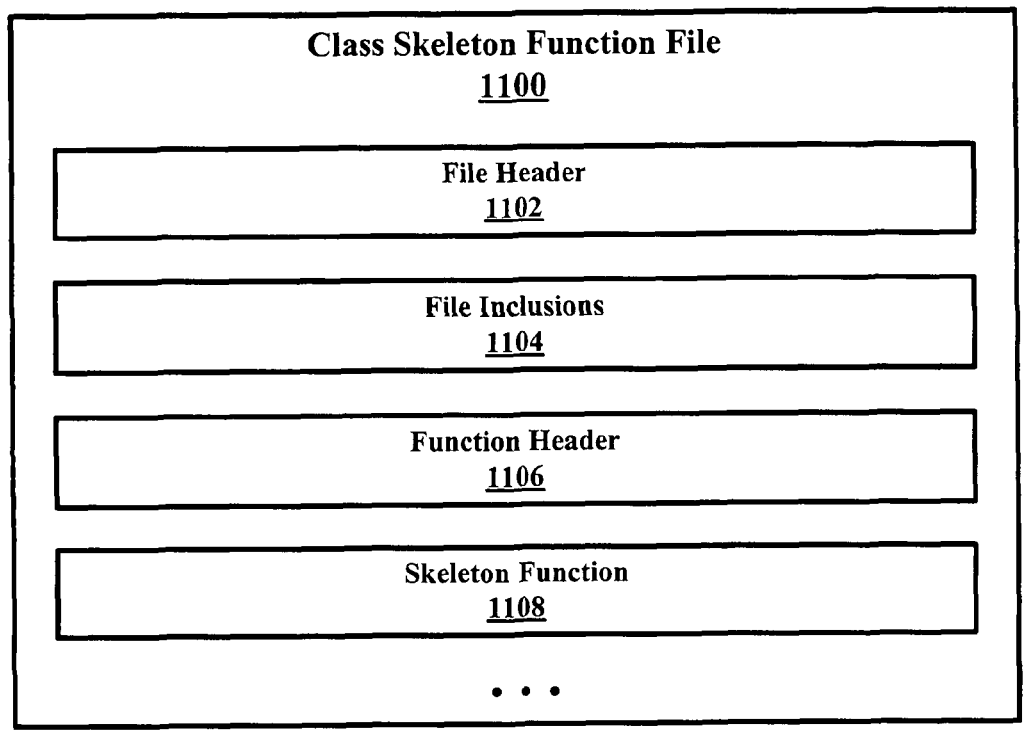
FIG. 11 depicts one format for a class skeleton function file that is generated to include skeleton code.

FIG. 11 depicts one format for a class skeleton function file 1100 that is generated to include skeleton code. The class skeleton function file 1100 contains the skeleton code of the functions of the class. The class skeleton function file 1100 corresponds to the .cpp that is created for a class of the software design specification 110. In one embodiment, class skeleton function file 1100 includes a file header 1102, file inclusions 1104, a function header 1106, and a skeleton function 1108.

The file header 1102 may contain a description of the file and class, and the history of the file. The file inclusions 1104 may contain one or more preprocessor directives that include other files that may be needed by the functions of the class. The function header 1106 includes a description of the function of the class and the algorithm that the function implements. The function header 1106 may also include comments that document the function. These comments may correspond to parts of function definitions 940 (FIG. 9). The skeleton function 1108 is the implementation of the function containing only debug statements and a statement to return a value if the function returns a value. The skeleton function 1108 does not contain the code that performs the algorithm of the function. There may exist multiple function headers 1106 and skeleton functions 1108 for each function of the class.

Output Directory Creation

Figure 12:
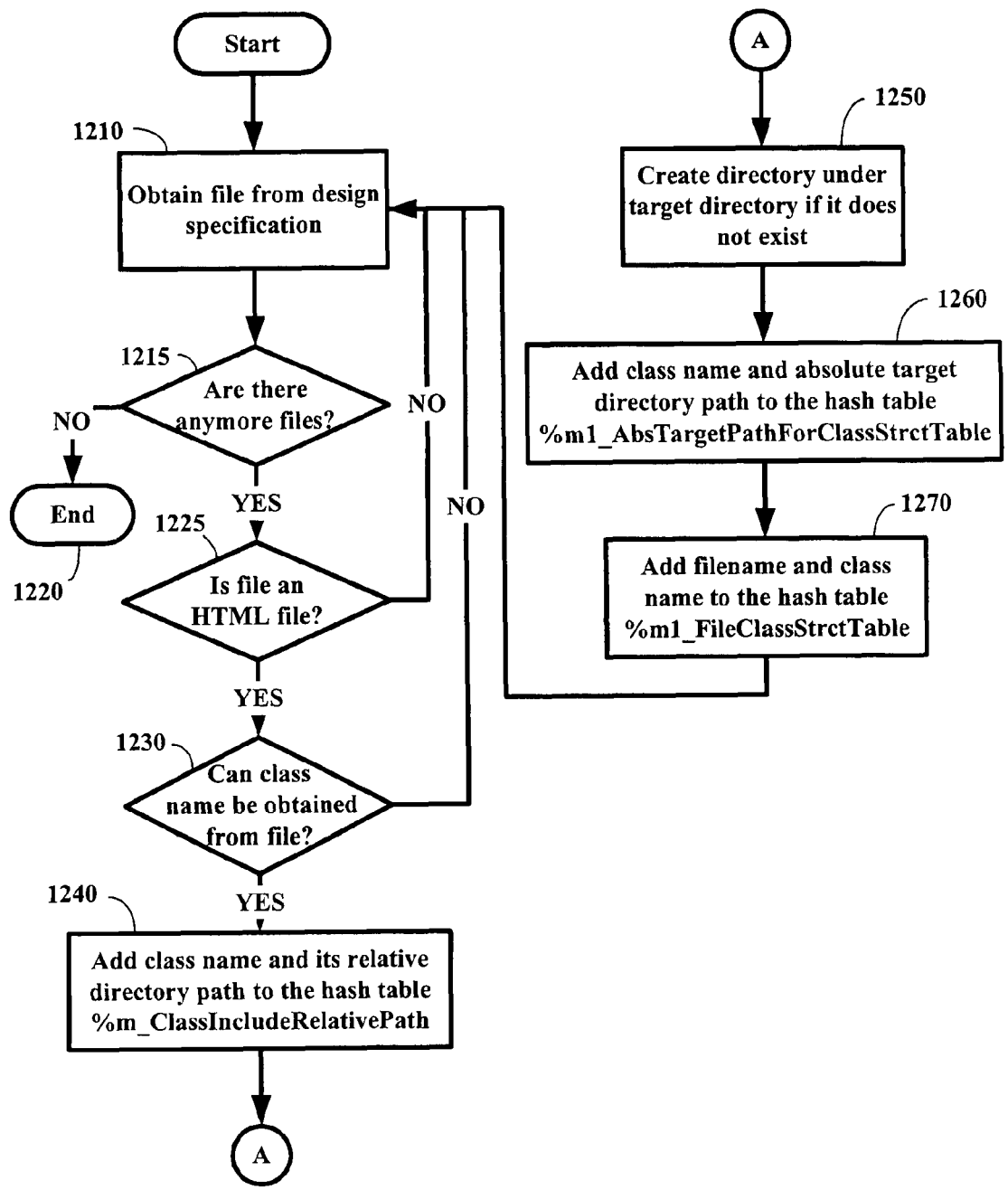
FIG. 12 provides a method for creating an output directory based on a directory that forms a software design specification.

FIG. 12 depicts a method for creating output directory 600 (see FIG. 6) based on a software design specification directory 502 (see FIG. 5). Thus, a method such as described in FIG. 12 assumes that the software design specification 110 is itself structured as a directory that is to form the basis of output directory 600. Other embodiments may use other sources or information for creating output directory 600. For example, the structure of the output directory 600 may be defined explicitly on one of the electronic documents of the software design specification 110. A method such as provided by FIG. 12 may be performed by skeleton code generator 130. In particular, file structure generator package 810 may perform steps such as described.

A method such as described in FIG. 12 may comprise steps performed by the skeleton code generator 130 while making a first pass through the software design specification 110. In one embodiment, the skeleton code generator 130 makes the first pass in order to create the output directory 600. A second pass through the software design specification 110 is subsequently performed to generate skeleton code in the output directory 600. In one embodiment, methods such as described in FIG. 13 and/or FIG. 14 are performed in making additional passes through the software design specification 110 in order to add one or more types of program files to the output directory 600 (FIG. 6). In one embodiment, a declaration file and an implementation file are created that contain code generated by the skeleton code generator 130.

With reference to FIG. 12, step 1210 provides that a file is obtained from the software design specification 110. The file may correspond to an electronic document containing text, tags and other content. The file may contain data corresponding to, for example, a description of the software system, one of the packages for the software system, or a class that is to be implemented in the software system.

In step 1215, a determination is made as to whether other files exist in the software design specification 110. If no other files exist, the method is terminated in step 1220. Step 1220 may correspond to the creation of the output directory 600 being completed.

If there are other files, then the file is located and step 1225 provides that a determination is made as to whether the file is an HTML file. Other embodiments may make a determination as to whether the file is another formatting type, such as XML. If the determination is that the file is not HTML (or of the specific desired formatting type), then the method is repeated starting at step 1210. In one embodiment, file structure generator package 810 (see FIG. 8) is configured to perform steps 1210, 1215, and 1220 by navigating through the software design specification directory 502 to access all the files in the design specification.

If the located file is HTML formatted, then a determination is made in step 1230 as to whether a class name can be obtained from the file. In one embodiment, the class name is designated by a special character, such as "C". For example, "C" may be set aside so as to only be used as the first character of a class name. If the determination in step 1230 is that the class name cannot be found from the located file, then the method is repeated starting from step 1210.

If the determination in step 1230 is that the class name can be obtained from the file, then step 1240 provides that the class name and the file's relative directory path in the software design specification 110 are added to a hash table. The relative directory path corresponds to the path from the top directory of the software design specification directory 502 to the directory containing the file for the class specification. The formatting of the data placed in the hash table may be provided in the following example hash table: % m_ClassIncludeRelativePath. A description of this example hash table is provided in FIG. 15A and FIG. 16A.

Following step 1240, step 1250 provides that the output directory 600 is created based on the structure of the software design specification directory 502 (FIG. 5). In one embodiment, the directory structure that contains the skeleton code mirrors the directory structure of the software design specification directory 502.

In step 1260, the class name and the absolute target directory path are added to the hash table. The absolute target directory path corresponds to the directory path in the output directory 600 where the files for the skeleton code for the class will be generated. The formatting of the data placed in the hash table may be provided in the following example hash table: % m1_AbsTargetPathForClassStrctTable. A description of this example hash table is provided in FIGS. 15C and 21A.

Step 1270 provides that the filename and the class name are added to the hash table. The formatting of the data placed in the hash table may be provided in the following example Hash table: % m1_FileClassStrctTable. A description of this example hash table is provided in FIG. 15D and FIG. 22A. Many reasons exist for maintaining the absolute directory path, file name and class name in the hash tables. One such reason is that maintaining such data structures together in one hash table enables look-up mechanisms where code can be generated to account for one class being included by another class.

Figure 13:
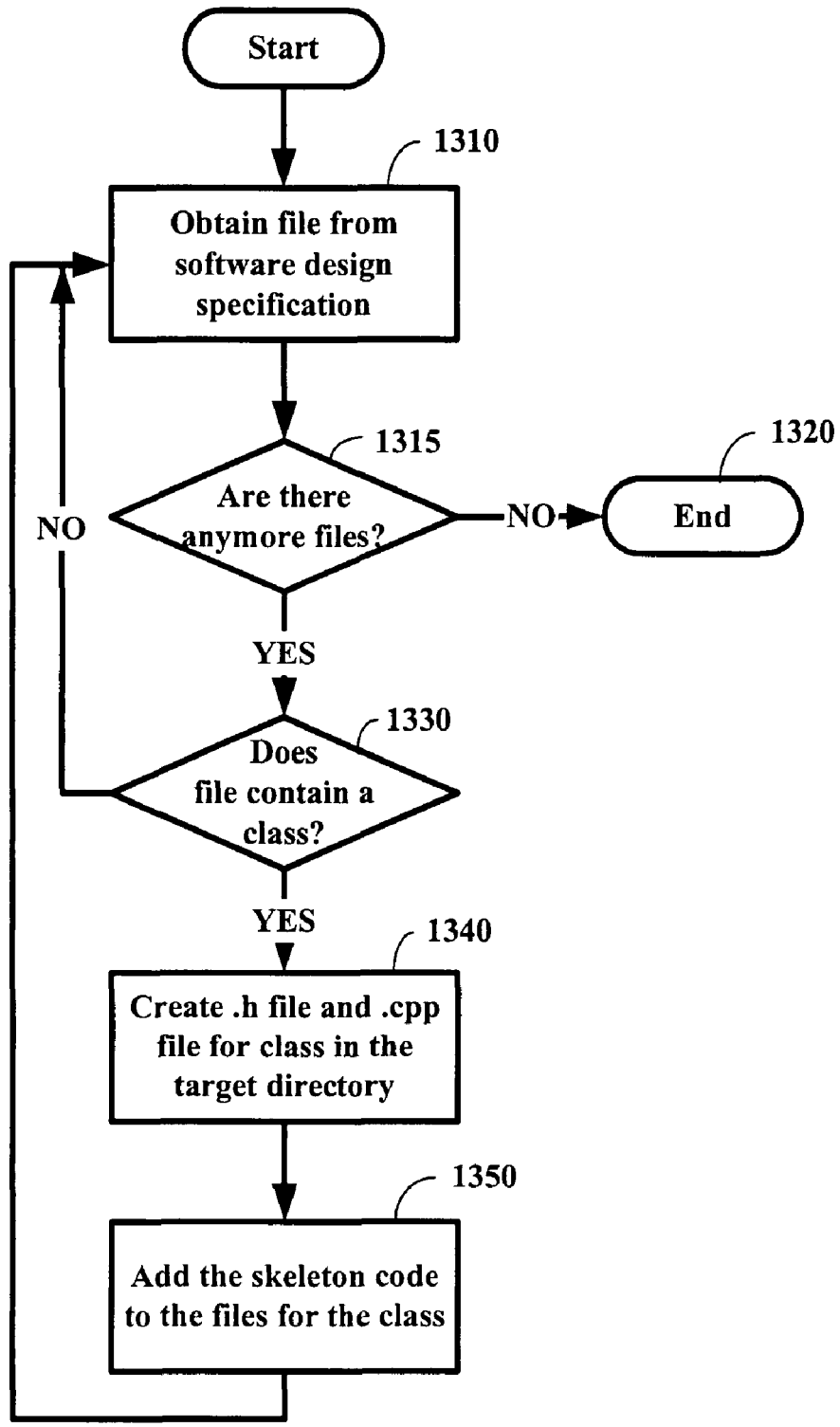
FIG. 13 describes a method for generating skeleton code for program files based on software classes that are defined in the design specification.
Figure 14:
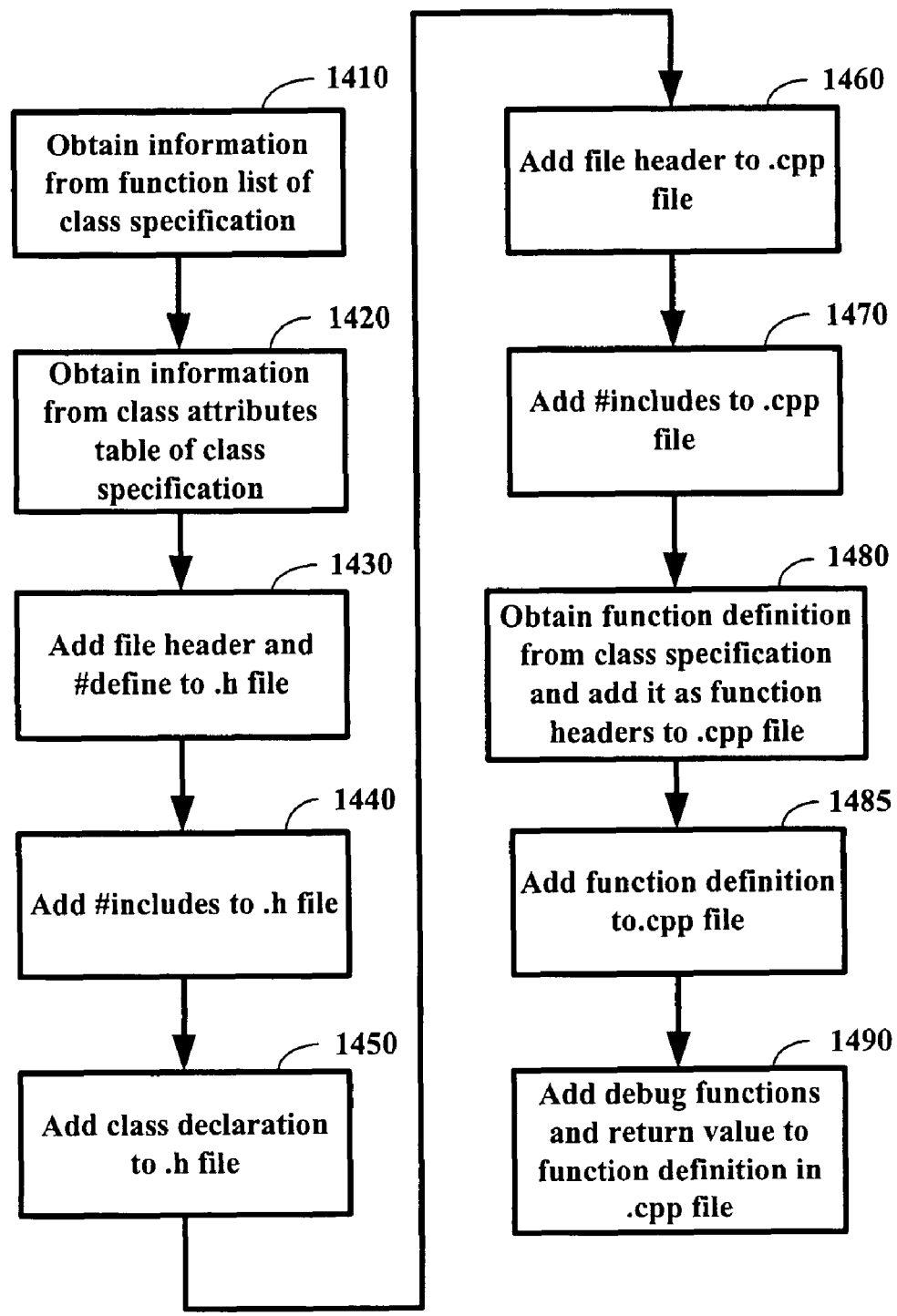
FIG. 14 depicts a method for generating code with a component of a code generator, according to an embodiment of the invention.

FIG. 13 describes a method for generating skeleton code for program files based on software classes that are defined in the software design specification 110. In one embodiment, the file structure generator package 810 (FIG. 8) of the skeleton code generator 130 substantially performs the steps described in FIG. 13. A method such as described in FIG. 13 may correspond to the file structure generator package 810 of the skeleton code generator 130 making the second pass through the software design specification 110. In one embodiment, skeleton code is generated as the file structure generator package 810 (FIG. 8) accesses all the files corresponding to the class specification.

In step 1310, a file from the software design specification 110 is identified. If a determination in step 1315 is made that no files can be identified, then step 1320 provides that the generation of the skeleton code for all the classes is complete. Otherwise, if another file can be identified, then step 1330 makes a determination to see if the file contains a class specification (see 900 in FIG. 9). In one embodiment, a hash table created by the file structure generator package 810 (e.g. % m1_FileClassStrctTable) is used to determine if the file corresponds to the class specification.

If the determination in step 1330 is that the file does not contain the class specification, then the method is repeated beginning at step 1310. If the determination in step 1330 is that the file does contain a class, then step 1340 provides for creating the program files in output directory 600. As explained, these program files may correspond to the declaration file (the .h file) and the implementation file (.cpp file). The location within output directory 600 where the skeleton code for the class is created may be determined using the absolute directory path stored in the hash table % m1_AbsTargetPathForClassStrctTable (see FIG. 12).

In step 1350, the skeleton code is added to the individual program files created for the class. The skeleton code may adhere to a specific convention or format, such as depicted in Appendix A and Appendix B. Following step 1350, step 1310 is repeated until the method ends in step 1320. In one embodiment, the file structure generator package 810 interacts with the class skeleton code generator package 820 to perform one or more steps recited above. In particular, the file structure generator package 810 interacts with the class skeleton code generator package 820 in order to generate the skeleton code for the class.

Skeleton Code Generation

FIG. 14 depicts a method for generating skeleton code according to an embodiment of the invention. As with FIG. 13, a method such as described in FIG. 14 may be performed once the output directory 600 has been created. This may correspond to a second or additional pass of the software design specification 110. In one embodiment, a method such as described in FIG. 14 is performed by file structure generator package 810 providing the class skeleton code generator package 820 access to a particular file that contains a class specification in order for the class skeleton code generator package to obtain information necessary for generating the skeleton code for program files of the output directory 600. For purpose of explanation, it is assumed that a method described with FIG. 14 provides for the generation of two program files, an implementation file and a declaration file, for each class that is identified from the software design specification 110, although the method may be modified for use with more or fewer program files.

Step 1410 provides that information from the function list is obtained from the software design specification 110. In one embodiment, this information is provided in the class specification (see component 900 in FIG. 9). This information may include the function declarations of the class associated with the class specification, as well as the enumerations, structures, and class declarations within the class.

In step 1420, information from class attributes specified in the class specification is obtained. This information may be obtained from, for example, a class attributes table of the class specification, although the particular format of how class attributes are provided may be set by conventions of the software design specification 110. Any characteristic, such as special characters or tags, may be included in the convention for providing class attributes, and class skeleton code generator package 820 may be configured to notice anyone of these characteristics. In one embodiment, the information from the class attributes may include the type and name of the class attributes.

Step 1430 provides that the file header and one or more preprocessor directives for preventing multiple inclusions (#define statement) are identified and added to .h program file created for the class.

In step 1440, the preprocessor directives (#include) are added to the .h file so that the file can access other files that are to be used by the particular class associated with the identified class specification.

Step 1450 provides that the class declaration is added to the .h file to complete the class declaration file. The information obtained from the function list and the class attributes table of the class specification are in the class declaration.

Steps 1460-1485 perform steps for generating the skeleton code for the .cpp file. In step 1460, the file header is added to the .cpp file created for the identified class specification.

In step 1470, the preprocessor directives for including other files used by the class (#include) are added to the .cpp file. When the .cpp file is completed and executed, these directives enable the .cpp file to access other files (which may contain functions or other classes) as required by the class specification used to create that file.

In step 1480, the function definition of the class specification is obtained and added to the .cpp file of the class. The function definition serves as the function header.

Step 1485 provides that the skeleton code for the function definition is generated and added to the .cpp file. This step may be performed by the skeleton code generator 130 mapping the identified information obtained from the software design specification 110 to specific syntax comprising the skeleton code.

In step 1490, certain specific functions are added to the .cpp program file. These functions may include functions for debugging the program file, and for printing out the function name. A statement may also be added for returning a value to the function definition in the .cpp file. In one embodiment, steps 1480 through 1490 are repeated for each function of the class to complete the class skeleton function file.

FIG. 14 depicts a method for generating a second portion of a skeleton code for program files generated by the skeleton code generator 130. While a method such as described by FIG. 14 is executed to append code to a method such as described in FIG. 13, embodiments of the invention may generate skeleton code using a method such as described in either FIG. 13 or FIG. 14 independently.

Hash Tables

As described above, embodiments of the invention use hash tables to store data that is subsequently used to track code generation. FIGS. 15A-15D depict four hash tables that may be used to automatically generate skeleton code. For example, the hash tables depicted by FIG. 15A-15D can be used by the skeleton code generator 130 to generate the skeleton code. The hash tables represent simple data structures that can be used to implement look-up schemes or mapping functions. Data structures other than hash tables may be used by other embodiments of the invention.

A first hash table 1510, depicted in FIG. 15A (entitled % m_ClassRelativeIncludePath), is for maintaining for reference the relative path of identified classes. The first hash table 1510 may be used by the file structure generator package 810 and class skeleton code generator package 820. The key 1512 of the first hash table 1510 is the name of a particular class. The value 1514 is the relative path of the class. In one embodiment, the relative path of the class corresponds to the directory path of the file in the software design specification directory 502 (FIG. 5) where the class specification 900 (see FIG. 9) was located, excluding the root node of the software design specification 110. The value 1514 will also correspond to the directory path where the skeleton code for the identified class is located in the output directory 600 (see FIG. 6). The first hash table 1510 is populated with class name and relative path for identified class specifications as the file structure generator package 810 navigates through the software design specification 110. This may happen during a first pass through that specification. In one embodiment, the first hash table 1510 is used to determine the directory path for when a file is included in a class in the .h file. This is how the preprocessor directives (#include) are provided. The first hash table 1510 may be populated using information obtained from performing a method such as described in FIG. 12.

A second hash table 1520, depicted in FIG. 15B (entitled % m2_ClassStructFunctionDecl), is for use in referencing the function declarations of a class and nested classes and structures within a class. The second hash table 1520 may be used by the class skeleton code generator package 820. The key 1522 of the second hash table 1520 is the name of a class, and the name of the classes and structures within another class. The value 1524 is another internal hash table 1526 containing information about the functions declared in the class and in the classes and structures within a class. The key 1527 of the internal hash table 1526 is the name of the function. The value 1529 of the internal hash table 1526 is the function declaration. The second hash table 1520 may be populated with information from the function list of the class specification 900 (See FIG. 9). In one embodiment, this hash table is used to add the skeleton code for each function in a corresponding implementation file (e.g. the .cpp file).

A third hash table 1530, depicted in FIG. 15C (entitled % m1_AbsTargetPathForClassStrctTable), is for use in tracking where code for a particular class identified from the software design specification 110 is to be generated. The third hash table 1530 may be used by the file structure generator package 810 of the skeleton code generator 130. A key 1532 of the third hash table 1530 is the name of the class. A value 1534 is the absolute directory path where the code for the class is to be generated. The absolute directory path is the combination of the absolute directory path of the top directory of the source code (or target directory), such as Directory of Code 610 described in FIG. 6, plus the relative directory path of the class determined from the software design specification 110. The third hash table 1530 may be populated when performing steps of a method such as recited in FIG. 12. FIG. 13 depicts how information from the third hash table 1530 may be used.

A fourth hash table 1540, depicted in FIG. 15D (entitled % m1_FileClassStrctTable), is for use in matching a file containing a class specification with a corresponding class name. The fourth hash table 1540 may be used by the file structure generator package 810. A key 1542 of the fourth hash table 1540 is the name of the file containing the class specification 900 (see FIG. 9). The value 1544 is a class associated with the file containing the class specification. FIG. 12 depicts how the fourth hash table 1540 may be populated with information. FIG. 13 depicts how information from the fourth hash table 1540 may be used.

Figure 16B:
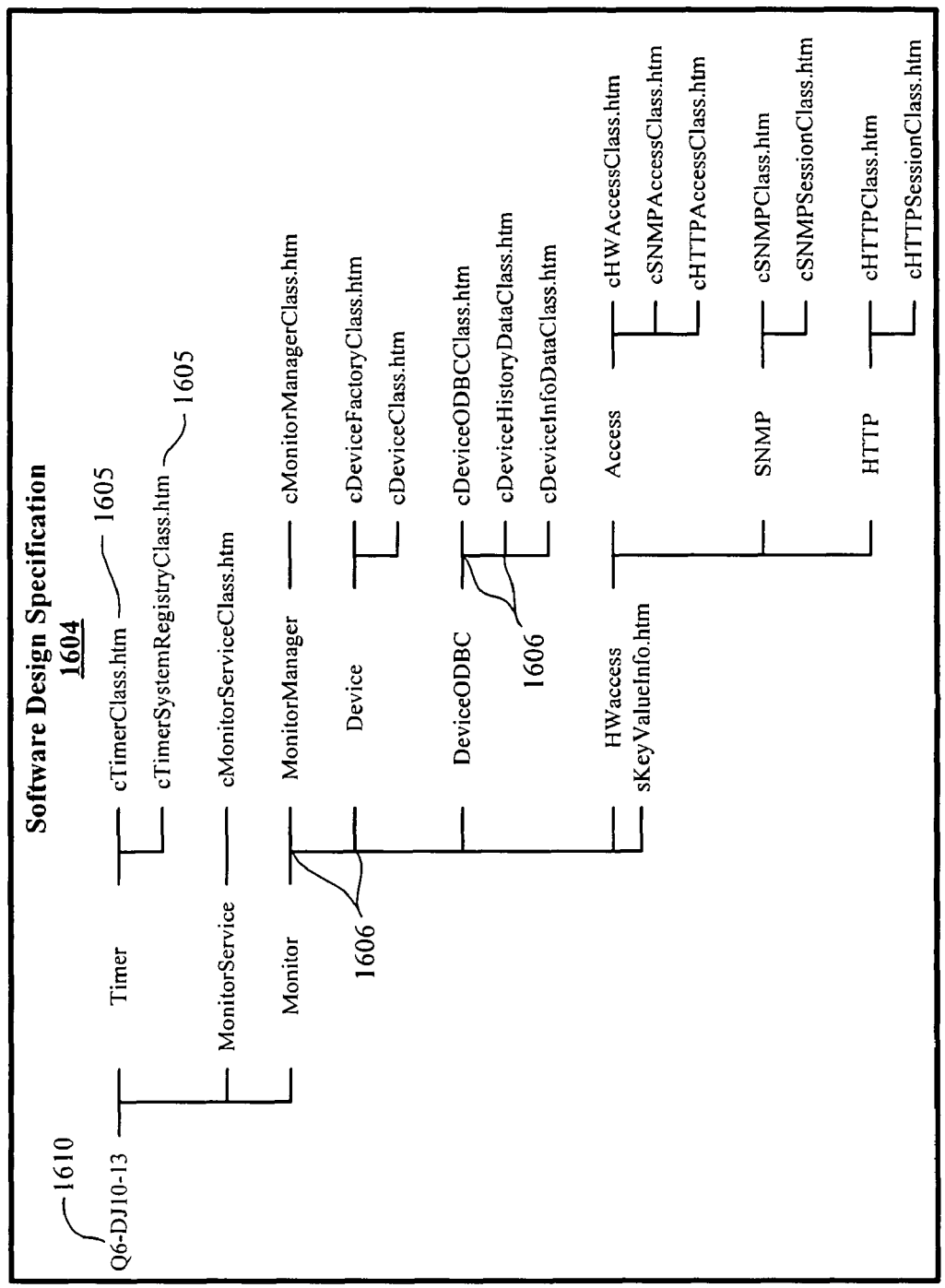
FIG. 16B depicts a software design directory that corresponds to the hash table of FIG. 16A.

FIG. 16A depicts an example of first hash table 1602 used by skeleton code generator 130. FIG. 16B depicts an example of a software design specification 1604. The first hash table 1602 applies to software design specification 1604. In the example provided, the software design specification 1604 includes HTML files corresponding to a plurality of class specifications. The software design specification 1604 may include branch nodes 1606. Branch nodes 1606 include nodes that provide access to more than one file or sub-directory structure. The skeleton code generator 130 may be configured to structure program files within output directory 600 to have a substantially similar directory structure as the software design specification 1604. The substantially similar directory structure may correspond to replication most or all of the branch nodes 1606.

In one embodiment, each class specification 1605 in the software design specification 1604 is to be provided a declaration file and an implementation file (corresponding to .h and .cpp file). The first hash table 1602 is populated with information obtained from the software design specification 1604. This information may correspond to the name of the class and its relative directory path from a top node 1610 of the software design specification 1604, where the top node 1610 is excluded from the relative path. As an example, the relative path of the class CSNMP is Monitor\HWaccess\SNMP\. The first hash table 1602 can be used to determine the location of files for the preprocessor directives (#include) that are added to the program and implementation files for each class.

Class Dependencies

It is not uncommon for one class in a software design to require the use of another class. In such scenarios, a first class is said to be dependent on a second class and may need to include the second class. The second class may be referred to or contained in the first class, so that the first class will need code that can execute the second class in order to itself execute properly. According to one embodiment of the invention, skeleton code generator 130 is configured to generate skeleton code that provides for dependent classes. Dependent classes includes classes that it uses.

Figure 17:
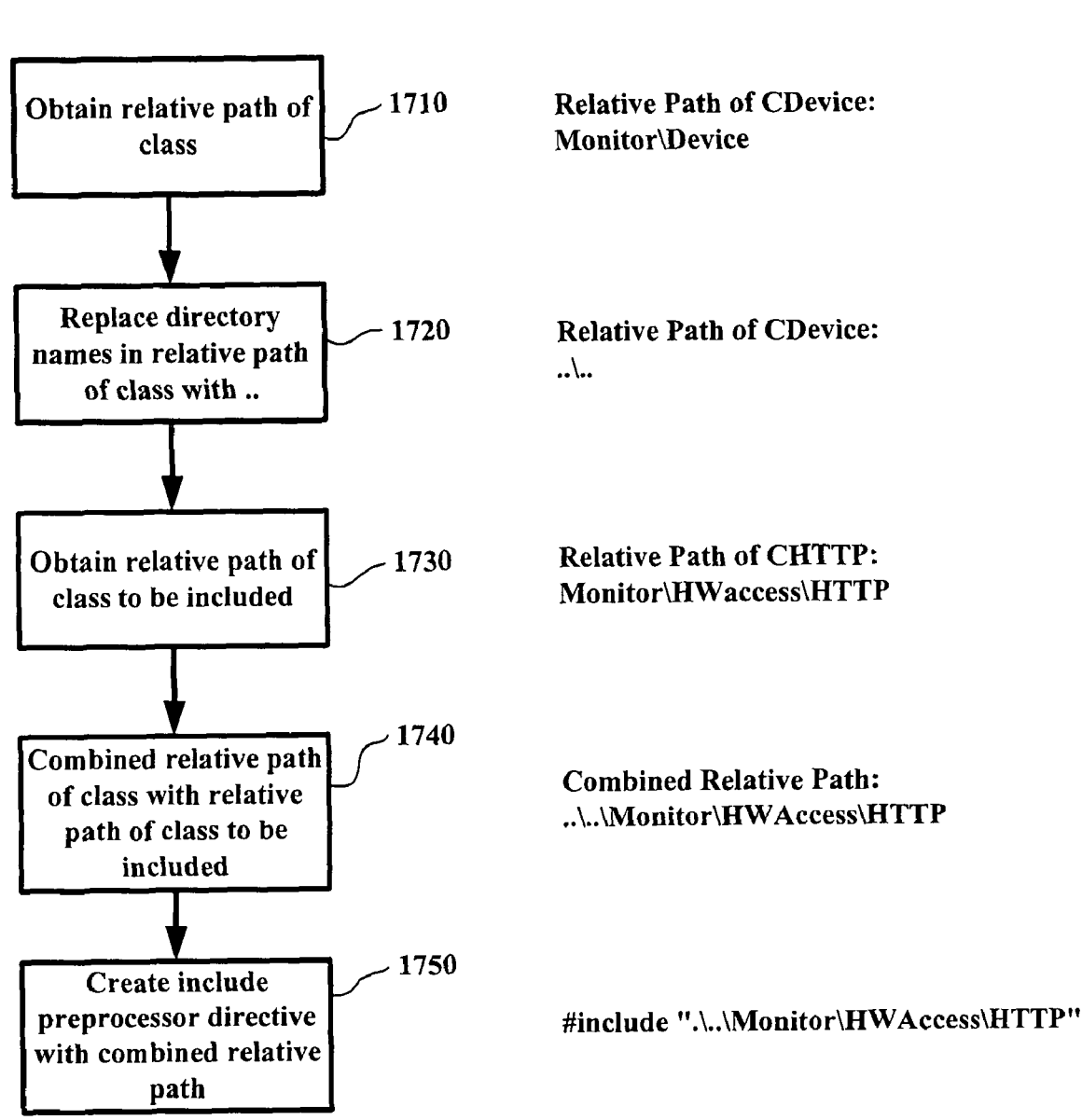
FIG. 17 depicts a method for providing skeleton code in one class that is for enabling that class to include another class when executed.

FIG. 17 depicts a method for providing skeleton code in one class that enables that class to include another class when executed. Consider an example where a class named CDevice uses a class named CHTTP. In this situation, code generated for the CDevice class should know about the code for the CHTTP class. The CHTTP class will need to be declared in order for the CDevice class to use it.

In FIG. 17, step 1710 provides that a relative directory path of the class for which the code in the declaration file is generated, is obtained from the first hash table 1602. In the example this may correspond to obtaining the relative directory path for CDevice. In one embodiment, the relative directory path of CDevice may be obtained from directory path of the file in the software design specification 1604 (FIG. 16B) that contains a class specification for CDevice, excluding the root node 1610. In the example provided, the relative path of CDevice is "Monitor\Device."

In step 1720, the directory path obtained in step 1710 is modified by replacing each directory name in the relative directory path with code that instructs the software to move up one node in the path name. In one implementation, this coding is represented by the following syntax: "..". Once this step is performed in the example provided, the relative path of CDevice is modified to "..\.."

Step 1730 provides that the relative directory path for the class to be used by the first class is obtained from the first hash table 1602. In the example provided, the relative path of the CHTTP class is "Monitor\HWaccess\HTTP."

Step 1740 provides that the relative directory path of the class CDevice, determined in step 1710, is combined with the relative directory path of the class CHTTP, obtained in step 1730. The combination is made by tagging the directory path of the class to be included to the right of the modified path from step 1720. For example, the modified directory path from step 1720 is "..\..\". For the example given, the combined directory path resulting from this step is "..\..\Monitor\HWaccess\HTTP". The compiler uses this information to find the location of the file to include. In the example provided, for CDevice to include CHTTP, the compiler goes up two nodes in the directory path from CDevice and then down three nodes to access the CHTTP file.

Step 1750 provides that the preprocessor directive (#include) is combined with the directory path generated and added to the declaration file of the class that is dependent on the other class (CHTTP). In the example provided, the resulting preprocessor directive is #include "..\..\Monitor\HWAccess\HTTP".

FIG. 18A depicts an example of the second hash table 1800 (% m2_ClassStructFunctionDecl). As described previously, the second hash table 1800 may be used in skeleton code generator 130 to generate a class skeleton function for each function of the class or each function declared within the classes or structs nested in a class. For reference, FIG. 18B is an example of the class specification 1802 of the software design specification 110. The class specification 1802 may correspond to an HTML file containing information about a class, such as provided in the example of FIG. 9. For purpose of explanation, only the class specification header (see 910 in FIG. 9) and the function list (920) are depicted and described for class specification 1802. The second hash table 1800 contains information found in the function list. The second hash table 1800 also contains all the functions declared for the class "CHTMLTextProcessor" and for the structure "SHTMLText".

Figure 19:
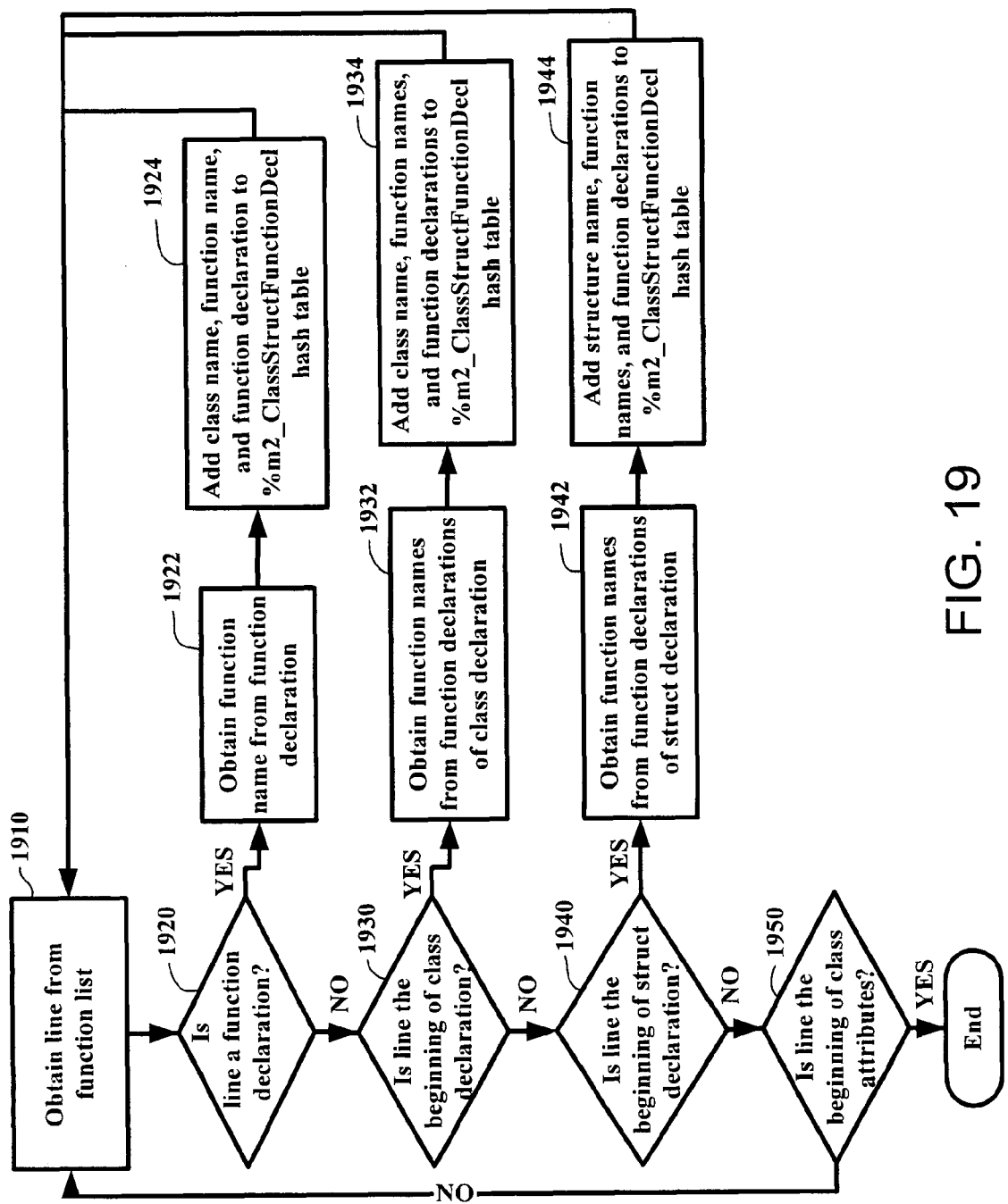
FIG. 19 depicts a method for adding information about functions of a class to a hash structure.

FIG. 19 depicts a method for adding information about functions of a class to the second hash table 1520 (See FIG. 15B). Such a method may be used to add the skeleton code for each function of an identified class to one or more program files for the class. In particular, a method such as described may be used to add skeleton code to the implementation file (the .cpp file).

In step 1910, a line is obtained from the function list of the class specification. It is assumed that the convention of the software design specification 110 is to correlate the presence of some lines with certain declarations within documents that form the software design specification 110. In other embodiments, other characters, combination of characters, images, or other markers may be used as the convention for indicating certain declarations in the specification.

In step 1920, the line obtained is checked to see if it is a function declaration. If the line is a function declaration, then step 1922 provides that the function name is obtained from the function declaration. Step 1924 provide that the class name, function name, and function declaration are added to the second hash table 1520 (see FIG. 15B). The method is then repeated beginning in step 1910.

If the determination in step 1920 is that the line is not a function declaration, then step 1930 provides that a determination is made as to whether the line is the beginning of a class declaration. If the determination is that the line is a class declaration, then step 1932 provides that the function names are obtained from the function declarations of the class declaration. Next, step 1934 provides that the class name, function names, and function declarations are added to the second hash table 1520. In steps 1932 and 1934, the lines of the class declaration are obtained to get all the function declarations of the class declaration. Following steps 1932 and 1934, the method is then repeated beginning in step 1910.

If the line is not the beginning of the class declaration in step 1930, then in step 1940, the line is checked to see if it is the beginning of a structure declaration within the class. If the line is the beginning of a structure declaration, then step 1942 provides that the function names are obtained from the function declarations of the structure declaration. Step 1944 provides that the structure name, function names, and function declarations are added to the second hash table 1520. The method is repeated beginning with step 1910. In steps 1942 and 1944, the lines of the structure declaration are obtained to get all the function declarations of the structure declaration.

If the line is not the beginning of the structure declaration in step 1940, then the line is checked to see if it is the beginning of a class attribute in step 1950. If the line is the beginning of the class attribute, then the second hash table 1520 is complete. Otherwise, the next line of the function list is obtained in step 1910.

Figure 20:
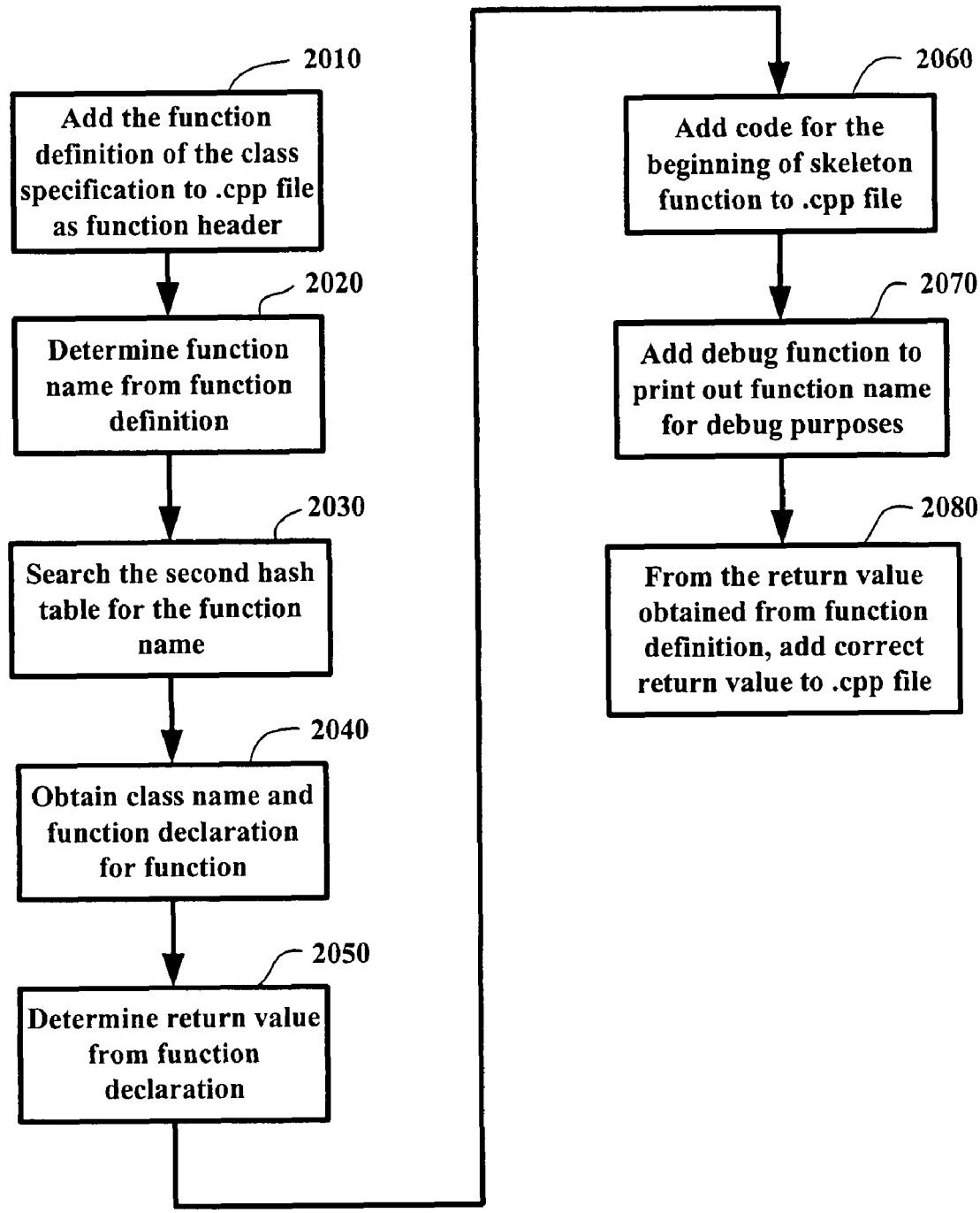
FIG. 20 describes a method for generating a class skeleton function using information in one of the hash tables.

FIG. 20 depicts a method for generating a class skeleton function using information from the second hash table 1520 (see FIG. 15B). While specific reference is made to a particular hash structure, a method such as described may be modified to generate the class skeleton function using another type of hash structure.

With reference to FIG. 20, step 2010 provides that the function definition provided in the class specification of the software design specification 1604 (FIG. 16B) is added to the implementation file for a given class specification. The function definition serves as the function header to document the function in the skeleton code.

In step 2020, the function name is obtained from the function definition. The format of the function definition allows the function name to be easily obtained.

In step 2030, the second hash table 1520 is searched to find the function name.

Step 2040 provides that the class name and the function declaration associated with the function name are obtained from the second hash table 1520.

Step 2050 determines the return value of the function from the function declaration.

From the return value, class name, and function declaration, step 2060 provides that the beginning of the skeleton function is added to the implementation file.

Step 2070 provides that a debug function is added to the implementation file in order to print out the function name for debug purposes.

In step 2080, the statement to return a value according to the return value of the function declaration is added to the implementation file. The process of this flowchart is repeated for each function definition of the given class specification.

Figure 21B:
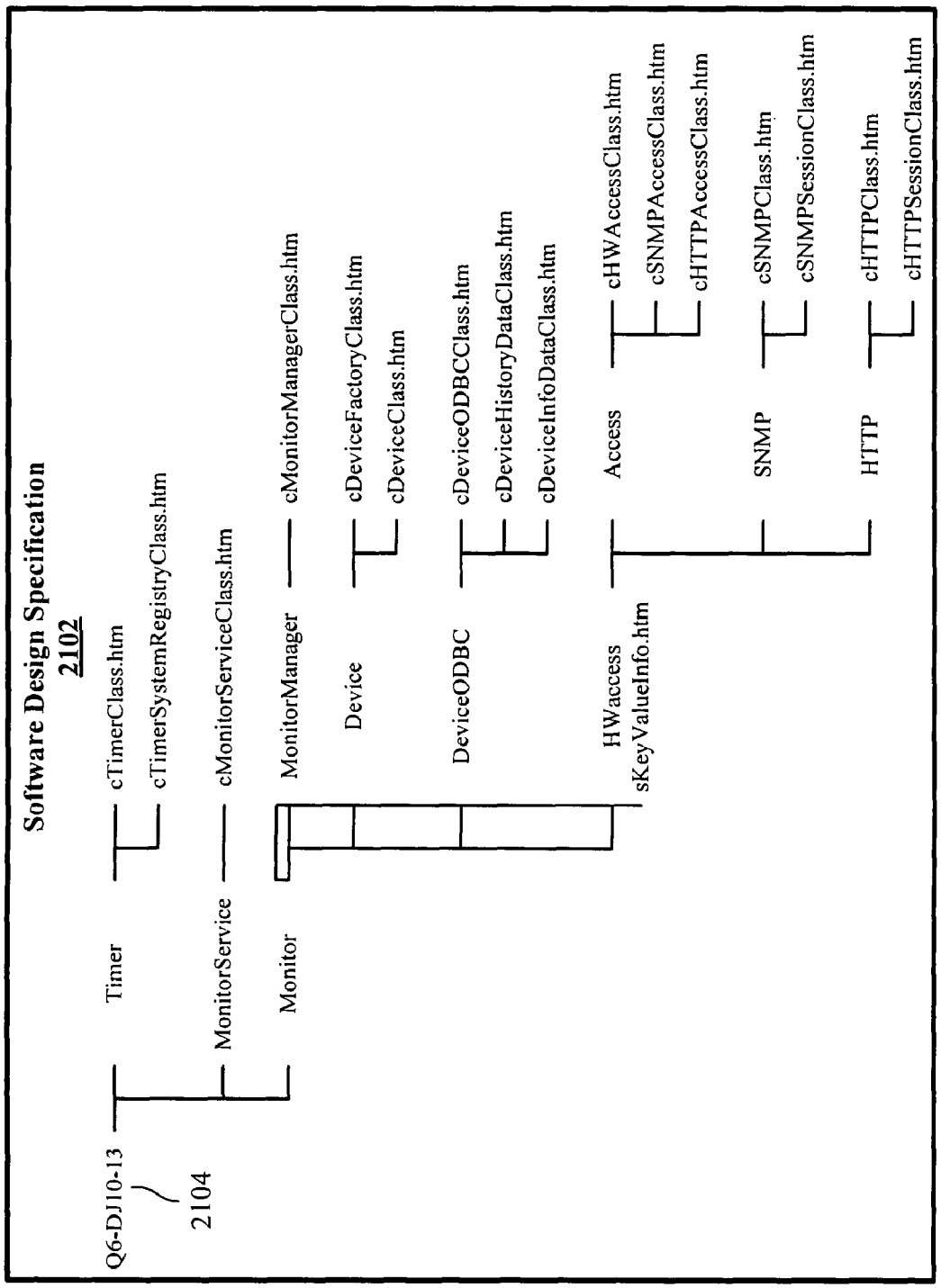
FIG. 21B depicts a software design directory that corresponds to the hash table of FIG. 21A.

FIG. 21A depicts an example of a hash table 2100 that depicts how the absolute directory path for program files of a class may be identified. The absolute directory path of any file corresponds to the directory path that locates that file in the output directory 600 (see FIG. 6). The hash table 2100 corresponds to the third hash table 1530 in FIG. 15C, except the hash table is depicted in FIG. 21A as being populated with the absolute directory paths for program files containing skeleton code in the output directory 600. FIG. 21B depicts a software design specification 2102 that is referenced by the hash table 2100. Class specifications in the directory structure are provided by one or more electronic documents, which may be formatted in HTML or XML. For brevity, other files that may be included in the software design specification 2102 are not depicted, such as text documents or files with figures.

The skeleton code generator 130 may be configured to generate skeleton code and place program files in the output directory 600 (FIG. 6), where the output directory has a directory structure that is substantially similar to the directory structure of the software design specification 2102. The hash table 2100 is used to maintain the location of the skeleton code of all the classes specified in the software design specification 110. The location of the program files for each class in the software design specification 2102 are added to the hash table 2100. In the example provided, each program file is added with its absolute target path for where the code for the class is to be provided in the output directory 600.

In an embodiment, the absolute target path is determined from two components. One component used in determining the absolute target path is the absolute directory path of the top directory of where the skeleton code is located. In FIG. 21A, "/CodeDir/" is the absolute path of the top directory. Another component used in determining the absolute target path is the relative directory path of the class from a top directory 2104 of the design specification (labeled "Q6-DJ10-13"). In the example depicted in FIG. 21A and FIG. 21B, the relative directory path of CHWaccess is "Monitor/HWaccess/Access/." The absolute target path is determined by combining both the absolute path of the top directory of the skeleton code and relative path of the class from the top directory 2104 of the class specification. In the example depicted in FIGS. 21A and 21B, the absolute directory path where the code is created for CHWaccess is "/CodeDir/Monitor/HWaccess/Access/."

To provide context with other embodiments, FIG. 12 depicts example steps performed by file structure generator package 810 when file structure generator package 810 goes through the files of the software design specification 2102 the first time. As the file structure generator package 810 encounters a file for the class specification, it determines the absolute directory path for the class and adds the class name and absolute directory path to the hash table 2100. Similarly, FIG. 13 depicts a method where the file structure generator package 810 goes through the files of the software design specification 2102 a second time. As the file structure generator package 810 encounters a file for the class specification, it obtains the absolute directory path of the class from the hash table 2100. The absolute directory path is used to create the declaration and implementation files (the .h file and the .cpp files respectively).

Figure 22B:
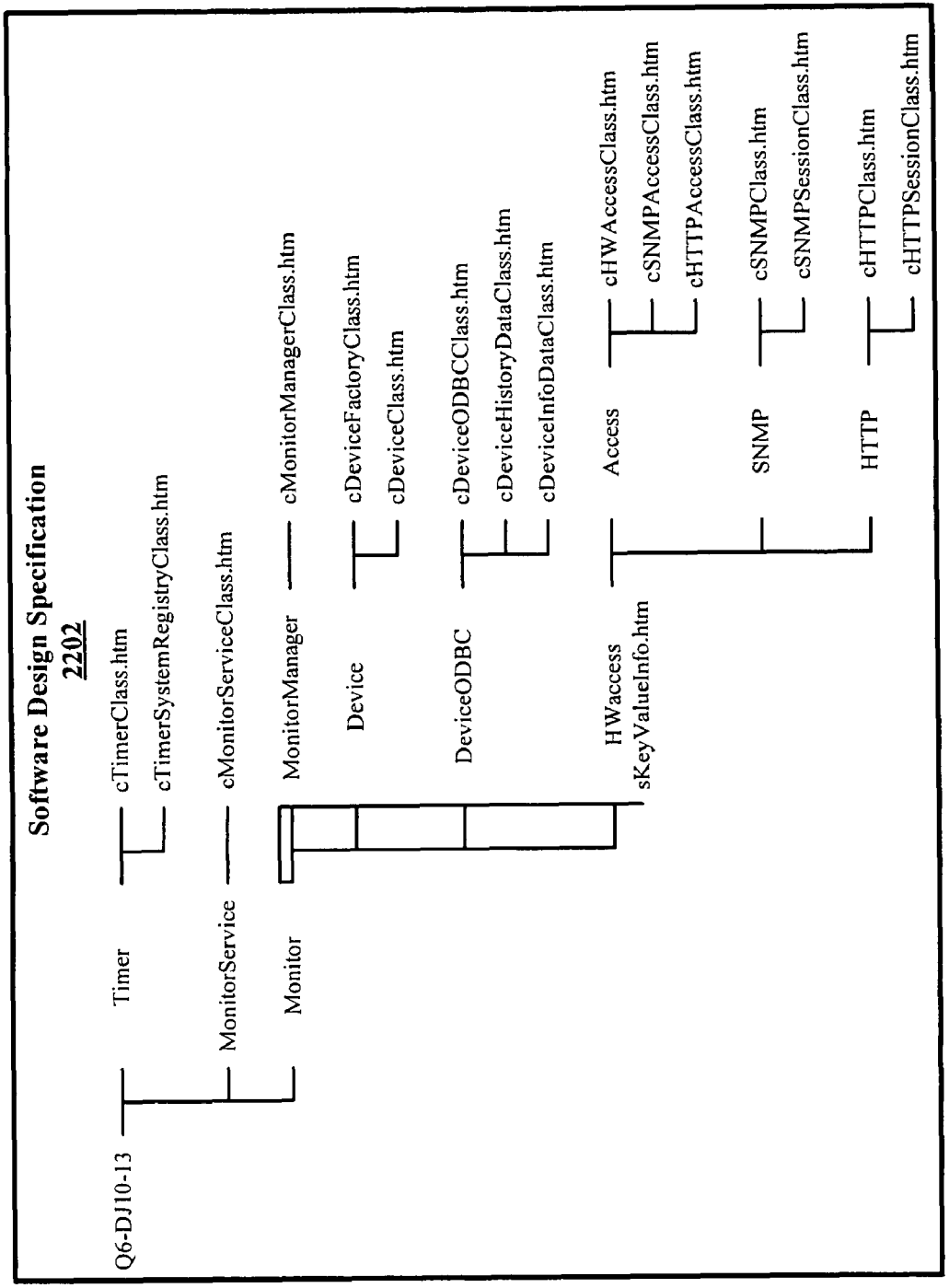
FIG. 22B depicts a software design directory that corresponds to the hash table of FIG. 22A.

FIG. 22A depicts an example of a hash table 2200 used by the skeleton code generator 130. The hash table 2200 may correspond to fourth hash table 1540 (% m1_FileClassStrctTable in FIG. 15D). FIG. 22B depicts a software design specification 2202 referenced by the hash table 2200. The software design specification 2202 includes directory structure where electronic documents are structured according to a class specification. As with the example above, files in the software design specification 2202 that are not class specification are not depicted. The skeleton code generator 130 is configured to generate skeleton code in program files having the same directory structure as the software design specification 2202. The hash table 2200 is used to maintain information about the class associated with the files for all class specification provided in the software design specification 2202.

In relation to what is described in FIG. 22, FIG. 12 depicts a method that, according to one embodiment, corresponds to file structure generator package 810 scanning through the files of software design specification 2202 for the first time. As the file structure generator package 810 encounters a file for the class specification, it adds the filename and class name to the hash table 2200. To determine if a file contains a class specification, the file must be opened and read to obtain the class name. FIG. 13 depicts a method where the file structure generator package 810 goes through the files of the software design specification 2202 the second time. As the file structure generator package 810 encounters a file, it determines the class name associated with the file from the hash table 2200. This eliminates the need to open each file of the design specification to determine the class name associated with the file.

Hardware Overview

Figure 23:
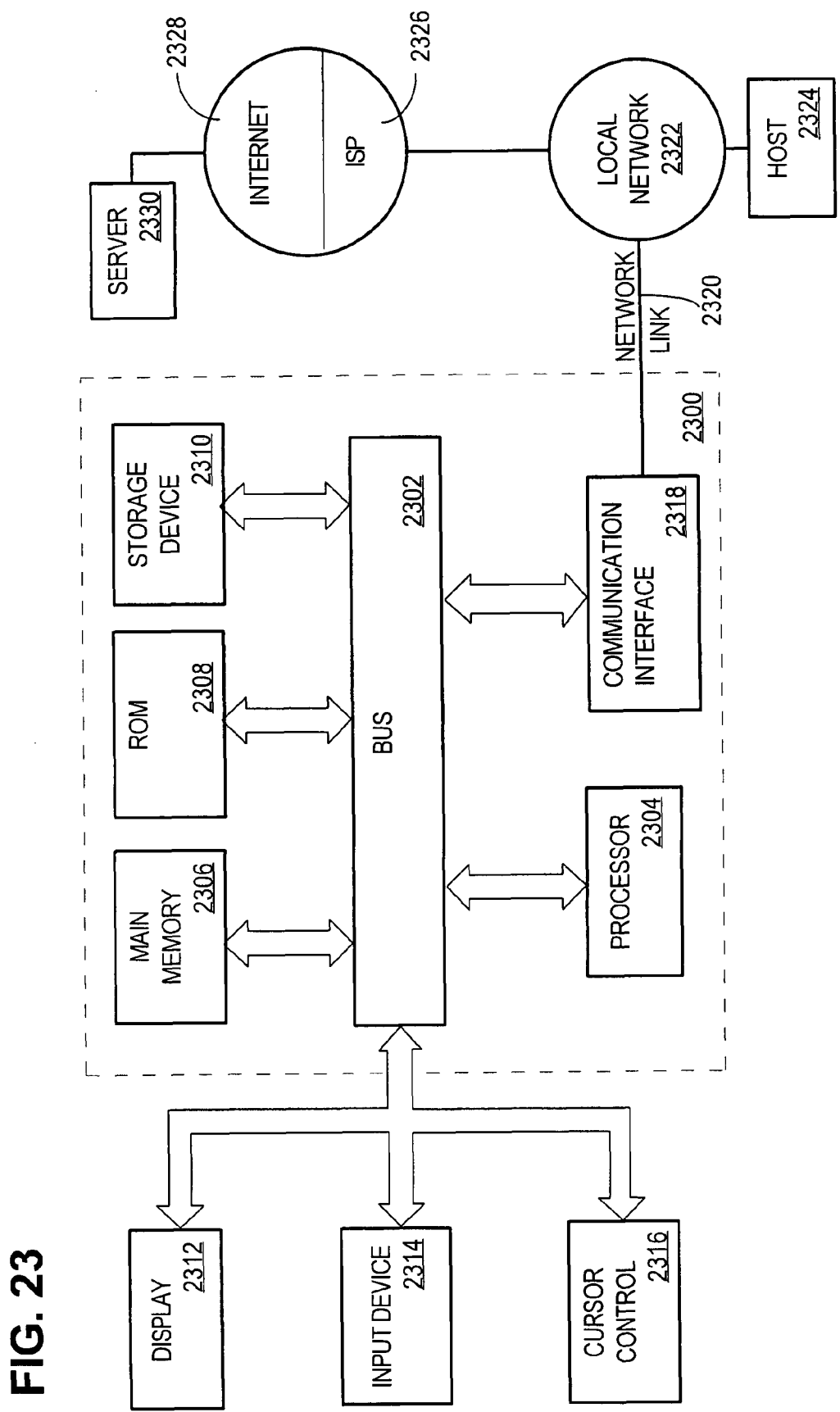
FIG. 23 is a block diagram that depicts a computer system upon which an embodiment of the invention may be implemented.

FIG. 23 is a block diagram that depicts a computer system 2300 upon which an embodiment of the invention may be implemented. Computer system 2300 includes a bus 2302 or other communication mechanism for communicating information, and a processor 2304 coupled with bus 2302 for processing information. Computer system 2300 also includes a main memory 2306, such as a random access memory (RAM) or other dynamic storage device, coupled to bus 2302 for storing information and instructions to be executed by processor 2304. Main memory 2306 also may be used for storing temporary variables or other intermediate information during execution of instructions to be executed by processor 2304. Computer system 2300 further includes a read only memory (ROM) 2308 or other static storage device coupled to bus 2302 for storing static information and instructions for processor 2304. A storage device 2310, such as a magnetic disk or optical disk, is provided and coupled to bus 2302 for storing information and instructions.

Computer system 2300 may be coupled via bus 2302 to a display 2312, such as a cathode ray tube (CRT), for displaying information to a computer user. An input device 2314, including alphanumeric and other keys, is coupled to bus 2302 for communicating information and command selections to processor 2304. Another type of user input device is cursor control 2316, such as a mouse, a trackball, or cursor direction keys for communicating direction information and command selections to processor 2304 and for controlling cursor movement on display 2312. This input device typically has two degrees of freedom in two axes, a first axis (e.g., x) and a second axis (e.g., y), that allows the device to specify positions in a plane.

The invention is related to the use of computer system 2300 for implementing the techniques described herein. According to one embodiment of the invention, those techniques are performed by computer system 2300 in response to processor 2304 executing one or more sequences of one or more instructions contained in main memory 2306. Such instructions may be read into main memory 2306 from another computer-readable medium, such as storage device 2310. Execution of the sequences of instructions contained in main memory 2306 causes processor 2304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 2304 for execution. Such a medium may take many forms, including but not limited to, non-volatile media, volatile media, and transmission media. Non-volatile media includes, for example, optical or magnetic disks, such as storage device 2310. Volatile media includes dynamic memory, such as main memory 2306. Transmission media includes coaxial cables, copper wire and fiber optics, including the wires that comprise bus 2302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 2304 for execution. For example, the instructions may initially be carried on a magnetic disk of a remote computer. The remote computer can load the instructions into its dynamic memory and send the instructions over a telephone line using a modem. A modem local to computer system 2300 can receive the data on the telephone line and use an infra-red transmitter to convert the data to an infra-red signal. An infra-red detector can receive the data carried in the infra-red signal and appropriate circuitry can place the data on bus 2302. Bus 2302 carries the data to main memory 2306, from which processor 2304 retrieves and executes the instructions. The instructions received by main memory 2306 may optionally be stored on storage device 2310 either before or after execution by processor 2304.

Computer system 2300 also includes a communication interface 2318 coupled to bus 2302. Communication interface 2318 provides a two-way data communication coupling to a network link 2320 that is connected to a local network 2322. For example, communication interface 2318 may be an integrated services digital network (ISDN) card or a modem to provide a data communication connection to a corresponding type of telephone line. As another example, communication interface 2318 may be a local area network (LAN) card to provide a data communication connection to a compatible LAN. Wireless links may also be implemented. In any such implementation, communication interface 2318 sends and receives electrical, electromagnetic or optical signals that carry digital data streams representing various types of information.

Network link 2320 typically provides data communication through one or more networks to other data devices. For example, network link 2320 may provide a connection through local network 2322 to a host computer 2324 or to data equipment operated by an Internet Service Provider (ISP) 2326. ISP 2326 in turn provides data communication services through the world wide packet data communication network now commonly referred to as the "Internet" 2328. Local network 2322 and Internet 2328 both use electrical, electromagnetic or optical signals that carry digital data streams. The signals through the various networks and the signals on network link 2320 and through communication interface 2318, which carry the digital data to and from computer system 2300, are exemplary forms of carrier waves transporting the information.

Computer system 2300 can send messages and receive data, including program code, through the network(s), network link 2320 and communication interface 2318. In the Internet example, a server 2330 might transmit a requested code for an application program through Internet 2328, ISP 2326, local network 2322 and communication interface 2318.

The received code may be executed by processor 2304 as it is received, and/or stored in storage device 2310, or other non-volatile storage for later execution. In this manner, computer system 2300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for automatically generating code, the method comprising the computer-implemented steps of:

scanning a plurality of electronic documents that form a software design specification, wherein the software design specification defines software functions that form a software system, and wherein the software design specification defines an output directory structure;

detecting, from interpreting the software design specification, one or more designated characteristics that define one or more functions and function attributes of the software system;

generating an output directory comprising a plurality of nodes, wherein a structure of the plurality of nodes of the output directory corresponds at least partially to the output directory structure defined by the software design specification;

programmatically generating skeleton code of at least a first program file from the one or more designated characteristics; and storing the first program file within a node of the plurality of nodes of the output directory that corresponds to a node in the directory structure defined by the software design specification where the one or more electronic documents that specify the one or more designated characteristics are located.

2. The method of claim 1, wherein programmatically generating skeleton code of at least a first program file from the one or more designated characteristics includes programmatically generating skeleton code of the first program file and of a second program file from the one or more designated characteristics.

3. The method of claim 2, further comprising locating the second program file at the node of the output directory with the first program file.

4. The method of claim 2, wherein the first program file corresponds to a declaration file of the software function, and wherein the second program file corresponds to an implementation file of the software function.

5. The method of claim 1, wherein detecting one or more designated characteristics of the software system includes detecting at least one of a tag or a character that correspond to a characteristic of the software function.

6. The method of claim 1, wherein detecting one or more designated characteristics of the software system includes detecting at least one of a tag or a character that delineates at least one of a function, a function attribute, and a comment for the software function.

7. The method of claim 1, wherein generating an output directory includes replicating a substantial portion of a node structure of the software design specification.

8. The method of claim 1, further comprising generating a data structure that maintains the location of the one or more functions and function attributes, wherein the one or more functions and function attributes are correlated to the directory path described in the software design specification wherein are located the one or more designated characteristics that correspond to elements defining the one or more functions and function attributes.

9. The method of claim 8, wherein the data structure comprises a hash table.

10. The method of claim 8, wherein a structure of the output directory is identical to the output directory structure defined by the software design specification except for the root node.

11. A non-transitory computer-readable medium for automatically generating code, the computer-readable medium carrying instructions which, when executed by one or more processors, cause:

scanning a plurality of electronic documents that form a software design specification, wherein the software design specification defines software functions that form a software system, and wherein the software design specification defines an output directory structure;

detecting, from interpreting the software design specification, one or more designated characteristics that define one or more functions and function attributes of the software system;

generating an output directory comprising a plurality of nodes, wherein a structure of the plurality of nodes of the output directory corresponds at least partially to the output directory structure defined by the software design specification;

programmatically generating skeleton code of at least a first program file from the one or more designated characteristics; and storing the first program file within a node of the plurality of nodes of the output directory that corresponds to a node in the directory structure defined by the software design specification where the one or more electronic documents that specify the one or more designated characteristics are located.

12. The non-transitory computer-readable medium of claim 11, wherein programmatically generating skeleton code of at least a first program file from the one or more designated characteristics includes programmatically generating skeleton code of the first program file and of a second program file from the one or more designated characteristics.

13. The non-transitory computer-readable medium of claim 12, further comprising additional instructions which, when executed by the one or more processors, causes locating the second program file at the node of the output directory with the first program file.

14. The non-transitory computer-readable medium of claim 12, wherein the first program file corresponds to a declaration file of the software function, and wherein the second program file corresponds to an implementation file of the software function.

15. The non-transitory computer-readable medium of claim 11, wherein detecting one or more designated characteristics of the software system includes detecting at least one of a tag or a character that correspond to a characteristic of the software function.

16. The non-transitory computer-readable medium of claim 11, wherein detecting one or more designated characteristics of the software system includes detecting at least one of a tag or a character that delineates at least one of a function, a function attribute, and a comment for the software function.

17. The non-transitory computer-readable medium of claim 11, wherein generating an output directory includes replicating a substantial portion of a node structure of the software design specification.

18. The non-transitory computer-readable medium of claim 11, further comprising generating a data structure that maintains the location of the one or more functions and function attributes, wherein the one or more functions and function attributes are correlated to the directory path described in the software design specification wherein are located the one or more designated characteristics that correspond to elements defining the one or more functions and function attributes.

19. The non-transitory computer-readable medium of claim 18, wherein the data structure comprises a hash table.

20. The non-transitory computer-readable medium of claim 18, wherein a structure of the output directory is identical to the output directory structure defined by the software design specification except for the root node.

21. An apparatus for automatically generating code, the apparatus comprising a memory storing instructions which, when executed by one or more processors, cause:

scanning a plurality of electronic documents that form a software design specification, wherein the software design specification defines software functions that form a software system, and wherein the software design specification defines an output directory structure;

detecting, from interpreting the software design specification, one or more designated characteristics that define one or more functions and function attributes of the software system;

generating an output directory comprising a plurality of nodes, wherein a structure of the plurality of nodes of the output directory corresponds at least partially to the output directory structure defined by the software design specification;

programmatically generating skeleton code of at least a first program file from the one or more designated characteristics; and storing the first program file within a node of the plurality of nodes of the output directory that corresponds to a node in the directory structure defined by the software design specification where the one or more electronic documents that specify the one or more designated characteristics are located.

22. The apparatus of claim 21, wherein programmatically generating skeleton code of at least a first program file from the one or more designated characteristics includes programmatically generating skeleton code of the first program file and of a second program file from the one or more designated characteristics.

23. The apparatus of claim 22, wherein the memory further stores additional instructions which, when executed by the one or more processors, causes locating the second program file at the node of the output directory with the first program file.

24. The apparatus of claim 21, wherein the first program file corresponds to a declaration file of the software function, and wherein the second program file corresponds to an implementation file of the software function.

25. The apparatus of claim 21, wherein detecting one or more designated characteristics of the software system includes detecting at least one of a tag or a character that correspond to a characteristic of the software function.

26. The apparatus of claim 21, wherein detecting one or more designated characteristics of the software system includes detecting at least one of a tag or a character that delineates at least one of a function, a function attribute, and a comment for the software function.

27. The apparatus of claim 21, wherein generating an output directory includes replicating a substantial portion of a node structure of the software design specification.

28. The apparatus of claim 21, further comprising generating a data structure that maintains the location of the one or more functions and function attributes, wherein the one or more functions and function attributes are correlated to the directory path described in the software design specification wherein are located the one or more designated characteristics that correspond to elements defining the one or more functions and function attributes.

29. The apparatus of claim 28, wherein the data structure comprises a hash table.

30. The apparatus of claim 28, wherein a structure of the output directory is identical to the output directory structure defined by the software design specification except for the root node.

* * * * *